(12) United States Patent
Chin et al.

(10) Patent No.: US 8,218,466 B2
(45) Date of Patent: Jul. 10, 2012

(54) METHODS AND APPARATUS FOR CHANGING PAGING PARAMETERS IN A COMMUNICATION SYSTEM

(75) Inventors: Tom Chin, San Diego, CA (US); Fangqi Hu, San Diego, CA (US); Kuo-Chun Lee, San Diego, CA (US); Guangming Carl Shi, San Diego, CA (US); Isaac Ta-yan Siu, San Diego, CA (US); Doo Seok Kim, Pleasanton, CA (US)

(73) Assignee: QUALCOMM Incorporated, San Diego, CA (US)

( * ) Notice: Subject to any disclaimer, the term of this patent is extended or adjusted under 35 U.S.C. 154(b) by 679 days.

(21) Appl. No.: 12/405,238

(22) Filed: Mar. 17, 2009

(65) Prior Publication Data
US 2010/0240420 A1    Sep. 23, 2010

(51) Int. Cl.
*G08C 17/00* (2006.01)
*H04W 4/00* (2009.01)
*H04M 1/00* (2006.01)

(52) U.S. Cl. .......... 370/311; 370/328; 455/574
(58) Field of Classification Search ......... 370/311, 370/328; 455/574
See application file for complete search history.

(56) References Cited

U.S. PATENT DOCUMENTS

| 2005/0265360 | A1 | 12/2005 | Kim et al. |
| 2006/0089161 | A1* | 4/2006 | Kim et al. ............... 455/458 |
| 2007/0087767 | A1 | 4/2007 | Pareek et al. |
| 2007/0099635 | A1* | 5/2007 | Mohanty et al. ........ 455/458 |
| 2008/0070594 | A1 | 3/2008 | Barber |
| 2008/0182596 | A1 | 7/2008 | Wang et al. |
| 2008/0311933 | A1* | 12/2008 | Lim et al. .............. 455/458 |
| 2010/0081454 | A1* | 4/2010 | Wang et al. .......... 455/456.1 |

FOREIGN PATENT DOCUMENTS
WO    WO2005079086    8/2005

OTHER PUBLICATIONS

International Search Report and Written Opinion—PCT/US2010/027454, International Search Authority—European Patent Office—Aug. 6, 2010.

* cited by examiner

*Primary Examiner* — Ronald Abelson
(74) *Attorney, Agent, or Firm* — Charles Chesney

(57) ABSTRACT

A base station and a subscriber station may negotiate paging parameters so that the subscriber station can enter idle mode. After the subscriber station has entered idle mode, the base station may change at least one paging parameter at the base station. The base station may direct the subscriber station to change at least one paging parameter at the subscriber station after the subscriber station has entered idle mode. The subscriber station may change at least one paging parameter at the subscriber station after the subscriber station has entered idle mode.

40 Claims, 20 Drawing Sheets

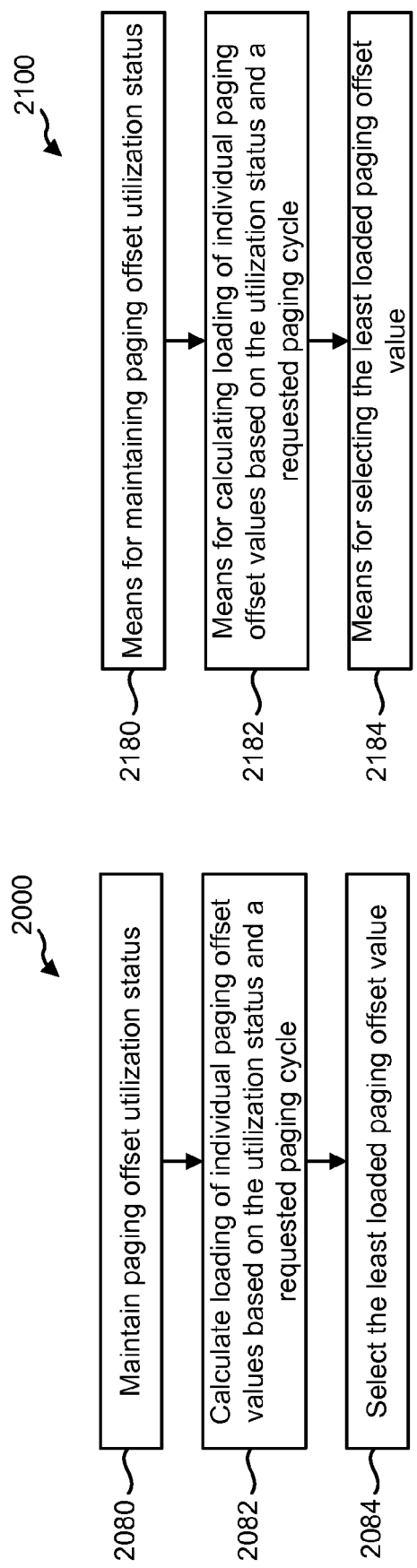

METHODS AND APPARATUS FOR CHANGING PAGING PARAMETERS IN A COMMUNICATION SYSTEM

TECHNICAL FIELD

The present disclosure relates generally to communication systems. More specifically, the present disclosure relates to methods and apparatus for changing paging parameters.

SUMMARY

In certain embodiments, a method for changing paging parameters in idle mode, which may be implemented by a base station, is disclosed. The base station may negotiate the paging parameters with a subscriber station so that the subscriber station can enter the idle mode. The base station may change at least one paging parameter at the base station after the subscriber station has entered the idle mode. The base station may direct the subscriber station to change at least one paging parameter at the subscriber station after the subscriber station has entered the idle mode.

In certain embodiments, a base station configured for changing paging parameters in idle mode is disclosed. The base station may include a processor, memory in electronic communication with the processor, and instructions stored in the memory. The instructions may be executable by the processor to negotiate the paging parameters with a subscriber station so that the subscriber station can enter the idle mode. The instructions may also be executable by the processor to change at least one paging parameter at the base station after the subscriber station has entered the idle mode. The instructions may also be executable by the processor to direct the subscriber station to change at least one paging parameter at the subscriber station after the subscriber station has entered the idle mode.

In certain embodiments, a base station configured for changing paging parameters in idle mode is disclosed. The base station may include means for negotiating the paging parameters with a subscriber station so that the subscriber station can enter the idle mode. The base station may also include means for changing at least one paging parameter at the base station after the subscriber station has entered the idle mode. The base station may also include means for directing the subscriber station to change at least one paging parameter at the subscriber station after the subscriber station has entered the idle mode.

In certain embodiments, a computer-program product for a base station to change paging parameters in idle mode is disclosed. The computer-program product includes a computer-readable medium having instructions thereon. The instructions may include code for negotiating the paging parameters with a subscriber station so that the subscriber station can enter the idle mode. The instructions may also include code for changing at least one paging parameter at the base station after the subscriber station has entered the idle mode. The instructions may also include code for directing the subscriber station to change at least one paging parameter at the subscriber station after the subscriber station has entered the idle mode.

In certain embodiments, a method for changing paging parameters in idle mode, which may be implemented by a subscriber station, is disclosed. The subscriber station may negotiate the paging parameters with a base station so that the subscriber station can enter idle mode. The subscriber station may receive directions from the base station to change at least one paging parameter at the subscriber station after the subscriber station has entered the idle mode. The subscriber station may change at least one paging parameter at the subscriber station after the subscriber station has entered the idle mode.

In certain embodiments, a subscriber station that is configured for changing paging parameters in idle mode is disclosed. The subscriber station may include a processor, memory in electronic communication with the processor, and instructions stored in the memory. The instructions may be executable by the processor to negotiate the paging parameters with a base station so that the subscriber station can enter idle mode. The instructions may also be executable by the processor to receive directions from the base station to change at least one paging parameter at the subscriber station after the subscriber station has entered the idle mode. The instructions may also be executable by the processor to change at least one paging parameter at the subscriber station after the subscriber station has entered the idle mode.

In certain embodiments, a subscriber station that is configured for changing paging parameters in idle mode is disclosed. The subscriber station may include means for negotiating the paging parameters with a base station so that the subscriber station can enter idle mode. The subscriber station may also include means for receiving directions from the base station to change at least one paging parameter at the subscriber station after the subscriber station has entered the idle mode. The subscriber station may also include means for changing at least one paging parameter at the subscriber station after the subscriber station has entered the idle mode.

In certain embodiments, a computer-program product for a subscriber station to change paging parameters in idle mode is disclosed. The computer-program product includes a computer-readable medium having instructions thereon. The instructions may include code for negotiating the paging parameters with a base station so that the subscriber station can enter idle mode. The instructions may also include code for receiving directions from the base station to change at least one paging parameter at the subscriber station after the subscriber station has entered the idle mode. The instructions may also include code for changing at least one paging parameter at the subscriber station after the subscriber station has entered the idle mode.

In certain embodiments, a method for selecting a paging offset, which may be implemented by a base station, is disclosed. The base station may receive a requested paging cycle from a subscriber station. The base station may select the paging offset so that the paging offset is randomly distributed within a range of the requested paging cycle. The base station may notify the subscriber station about the selected paging offset.

In certain embodiments, a base station that is configured for selecting a paging offset is disclosed. The base station may include a processor, memory in electronic communication with the processor, and instructions stored in the memory. The instructions may be executable by the processor to receive a requested paging cycle from a subscriber station. The instructions may also be executable by the processor to select the paging offset so that the paging offset is randomly distributed within a range of the requested paging cycle. The instructions may also be executable by the processor to notify the subscriber station about the selected paging offset.

In certain embodiments, a base station that is configured for selecting a paging offset is disclosed. The base station may include means for receiving a requested paging cycle from a subscriber station. The base station may also include means for selecting the paging offset so that the paging offset is randomly distributed within a range of the requested paging cycle. The base station may also include means for notifying the subscriber station about the selected paging offset.

In certain embodiments, a computer-program product for a base station to select a paging offset is disclosed. The computer-program product includes a computer-readable medium having instructions thereon. The instructions may include code for receiving a requested paging cycle from a subscriber station. The instructions may also include code for selecting the paging offset so that the paging offset is randomly distributed within a range of the requested paging cycle. The instructions may also include code for notifying the subscriber station about the selected paging offset.

In certain embodiments, a method for selecting a paging offset, which may be implemented by an Access Service Network-Gateway (ASN-GW), is disclosed. The ASN-GW may maintain paging offset utilization status for a paging group. The ASN-GW may also calculate loading of individual paging offset values for the paging group based on the paging offset utilization status and a paging cycle that is requested by a subscriber station. The ASN-GW may also select a least loaded paging offset value for the subscriber station.

In certain embodiments, an Access Service Network-Gateway (ASN-GW) that is configured for selecting a paging offset is disclosed. The ASN-GW may include a processor, memory in electronic communication with the processor, and instructions stored in the memory. The instructions may be executable by the processor to maintain paging offset utilization status for a paging group. The instructions may also be executable by the processor to calculate loading of individual paging offset values for the paging group based on the paging offset utilization status and a paging cycle that is requested by a subscriber station. The instructions may also be executable by the processor to select a least loaded paging offset value for the subscriber station.

In certain embodiments, an Access Service Network-Gateway (ASN-GW) that is configured for selecting a paging offset is disclosed. The ASN-GW may include means for maintaining paging offset utilization status for a paging group. The ASN-GW may also include means for calculating loading of individual paging offset values for the paging group based on the paging offset utilization status and a paging cycle that is requested by a subscriber station. The ASN-GW may also include means for selecting a least loaded paging offset value for the subscriber station.

In certain embodiments, a computer-program product for an Access Service Network-Gateway (ASN-GW) to select a paging offset is disclosed. The computer-program product includes a computer-readable medium having instructions thereon. The instructions may include code for maintaining paging offset utilization status for a paging group. The instructions may also include code for calculating loading of individual paging offset values for the paging group based on the paging offset utilization status and a paging cycle that is requested by a subscriber station. The instructions may also include code for selecting a least loaded paging offset value for the subscriber station.

BRIEF DESCRIPTION OF THE DRAWINGS

FIG. 20 illustrates a dynamic method for selecting a paging offset in accordance with the present disclosure;

FIG. 21 illustrates means-plus-function blocks corresponding to the method of FIG. 20.

DETAILED DESCRIPTION

Wireless communication systems have become an important means by which many people worldwide have come to communicate. A wireless communication system may provide communication for a number of subscriber stations, each of which may be serviced by a base station. As used herein, the term "subscriber station" refers to an electronic device that may be used for voice and/or data communication over a wireless communication system. Examples of subscriber stations include cellular phones, personal digital assistants (PDAs), handheld devices, wireless modems, laptop computers, personal computers, etc. A subscriber station may alternatively be referred to as an access terminal, a mobile terminal, a mobile station, a remote station, a user terminal, a terminal, a subscriber unit, a mobile device, a wireless device, user equipment, or some other similar terminology. The term "base station" refers to a wireless communication station that is installed at a fixed location and used to communicate with subscriber stations. A base station may alternatively be referred to as an access point, a Node B, an evolved Node B, or some other similar terminology.

A subscriber station may communicate with one or more base stations via transmissions on the uplink and the downlink. The uplink (or reverse link) refers to the communication link from the subscriber station to the base station, and the downlink (or forward link) refers to the communication link from the base station to the subscriber station.

The resources of a wireless communication system (e.g., bandwidth and transmit power) may be shared among multiple subscriber stations. A variety of multiple access techniques are known, including code division multiple access (CDMA), time division multiple access (TDMA), frequency division multiple access (FDMA), orthogonal frequency division multiple access (OFDMA), single-carrier frequency division multiple access (SC-FDMA), and so forth.

Figure 1:
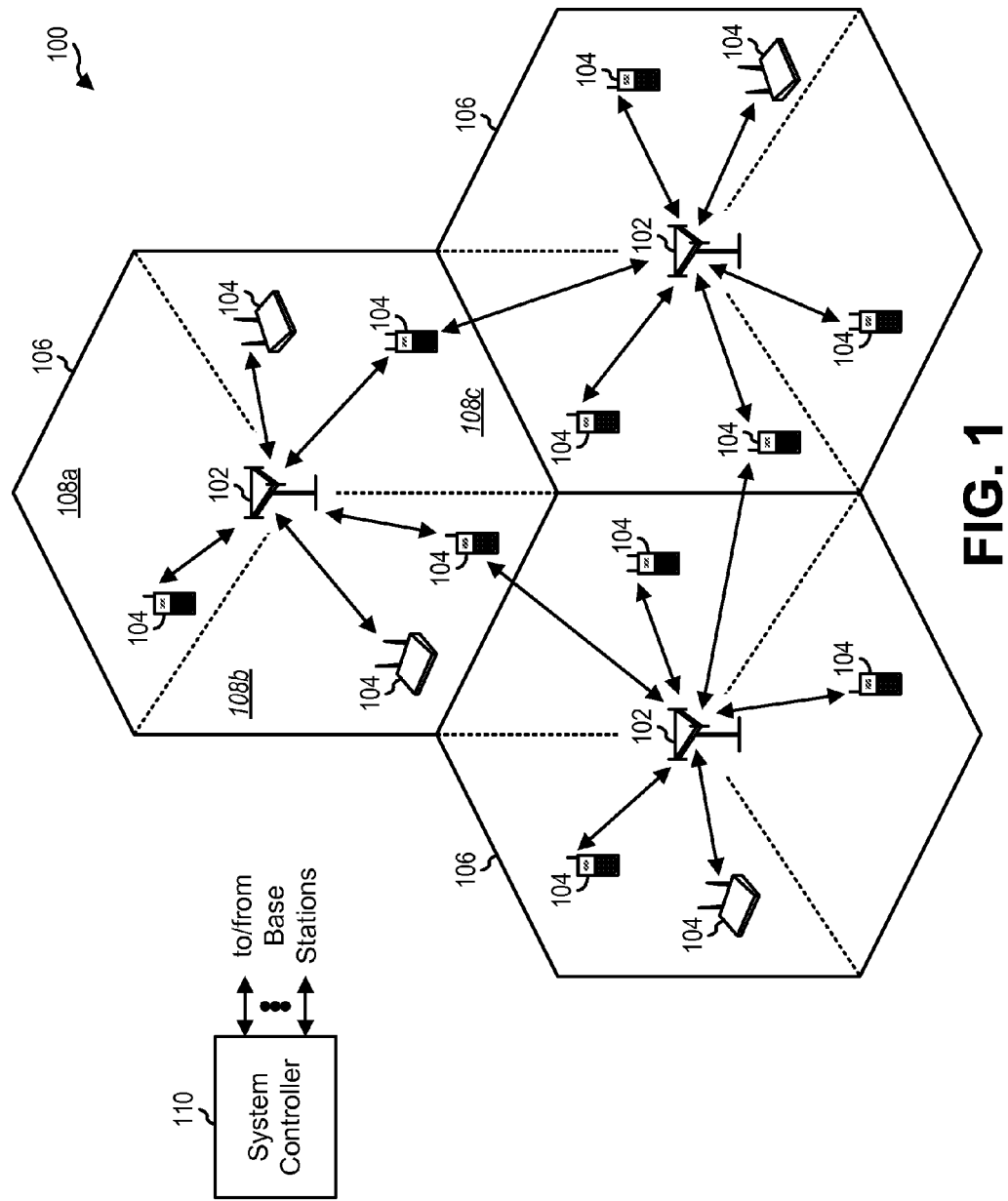
FIG. 1 illustrates an example of a wireless communication system in which the methods and apparatus disclosed herein may be utilized.

FIG. 1 shows an example of a wireless communication system 100 in which the methods and apparatus disclosed herein may be utilized. The wireless communication system 100 includes multiple base stations (BS) 102 and multiple subscriber stations (SS) 104. Each base station 102 provides communication coverage for a particular geographic area 106. The term "cell" can refer to a base station 102 and/or its coverage area 106 depending on the context in which the term is used.

To improve system capacity, a base station coverage area 106 may be partitioned into multiple smaller areas, e.g., three smaller areas 108a, 108b, and 108c. Each smaller area 108a, 108b, 108c may be served by a respective base transceiver station (BTS). The term "sector" can refer to a BTS and/or its coverage area 108 depending on the context in which the term is used. For a sectorized cell, the BTSs for all sectors of that cell are typically co-located within the base station 102 for the cell.

Subscriber stations 104 are typically dispersed throughout the system 100. A subscriber station 104 may communicate with zero, one, or multiple base stations 104 on the downlink and/or uplink at any given moment.

For a centralized architecture, a system controller 110 may couple to the base stations 102 and provide coordination and control for the base stations 102. The system controller 110 may be a single network entity or a collection of network entities. For a distributed architecture, base stations 102 may communicate with one another as needed.

The terms "system" and "network" may be used interchangeably herein. Thus, the wireless communication system 100 shown in FIG. 1 may also be referred to as a wireless communication network 100.

The IEEE 802.16 Working Group on Broadband Wireless Access Standards aims to prepare formal specifications for the global deployment of broadband Wireless Metropolitan Area Networks. Although the 802.16 family of standards is officially called WirelessMAN, it has been called "WiMAX" (which stands for the "Worldwide Interoperability for Microwave Access") by an industry group called the WiMAX Forum. Thus, the term "WiMAX" refers to a standards-based broadband wireless technology that provides high-throughput broadband connections over long distances. The term "WiMAX system" refers to a wireless communication system that is configured in accordance with one or more WiMAX standards.

The bandwidth and range of WiMAX make it suitable for a number of potential applications, including providing data and telecommunications services, connecting Wi-Fi hotspots with other parts of the Internet, providing a wireless alternative to cable and digital subscriber line for "last mile" broadband access, providing portable connectivity, etc.

The base stations 102 and the subscriber stations 104 in the wireless communication system 100 shown in FIG. 1 may be configured to support a WiMAX standard. Thus, the wireless communication system 100 in FIG. 1 may be referred to herein as a WiMAX system 100 (or WiMAX network 100).

Figure 2:
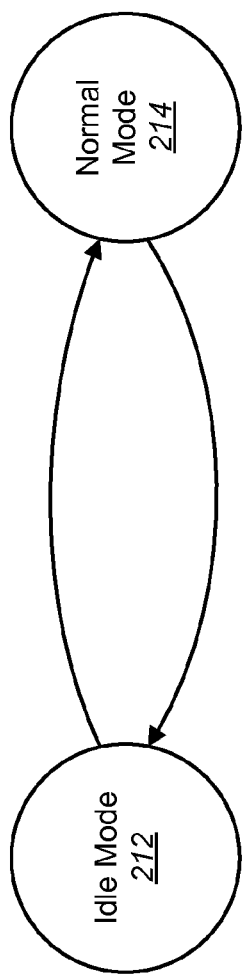
FIG. 2 illustrates a state diagram showing different modes of operation for a subscriber station in a WiMAX system.

Reference is now made to FIG. 2. Current WiMAX standards specify idle mode 212 operation for a subscriber station 104. Either a subscriber station 104 or a base station 102 may initiate negotiations to transition from normal mode 214 (which may also be referred to as active mode) to idle mode 212. Idle mode 212 allows a subscriber station 104 to completely turn off and to not be registered with any base station 102 and yet receive downlink broadcast traffic.

Figure 3:
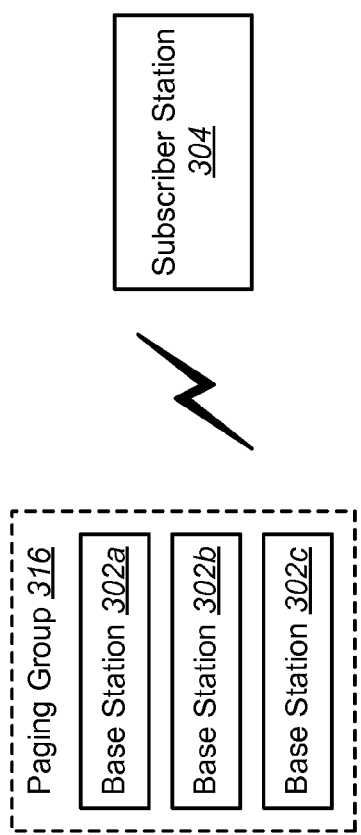
FIG. 3 illustrates a paging group in a WiMAX system.

Reference is now made to FIG. 3. When downlink traffic arrives for an idle-mode subscriber station 304, the subscriber station 304 may be paged by a collection of base stations 302 that form a paging group 316. The example paging group 316 shown in FIG. 3 includes three base stations 302a, 302b, 302c. A subscriber station 304 may be assigned to a paging group 316 before going into idle mode 212, and the subscriber station 304 may periodically wake up to update its paging group 316 in case there is a change.

Figure 4:
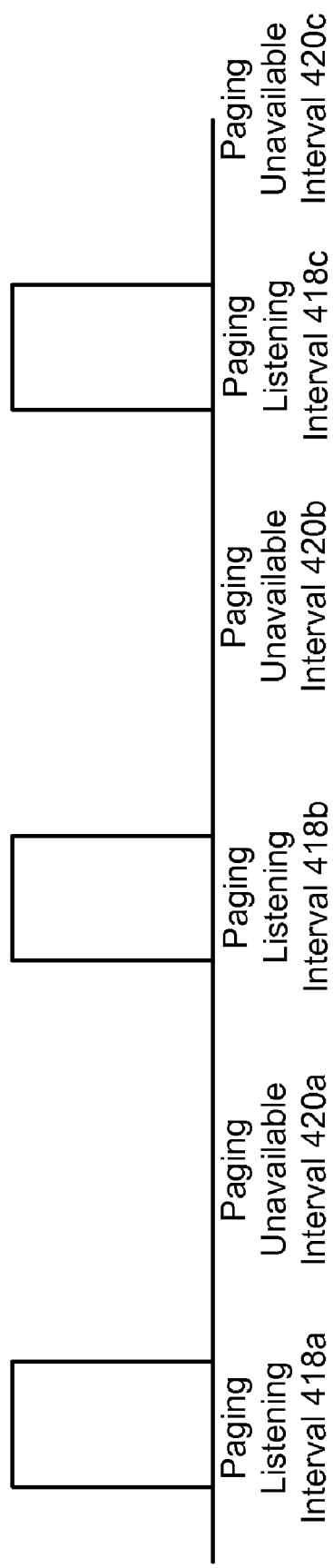
FIG. 4 illustrates paging listening intervals and paging unavailable intervals in a WiMAX system.

Reference is now made to FIG. 4. Once idle mode 212 is entered, there are scheduled paging listening intervals 418 and paging unavailable intervals 420. The example shown in FIG. 4 illustrates three paging listening intervals 418a, 418b, 418c and three paging unavailable intervals 420a, 420b, 420c. Table 1 summarizes the operation of a subscriber station 104 (SS) and a base station 102 (BS) during the two different intervals:

TABLE 1

|  | SS | BS |
| --- | --- | --- |
| Paging Listening Interval | SS is awake to listen to broadcast messages. | Sends at least one page (not necessary to each and every specific SS) |
| Paging Unavailable Interval | SS can tune away or go to power saving. | BS is not supposed to send anything to the SS during this interval. |

Figure 5:
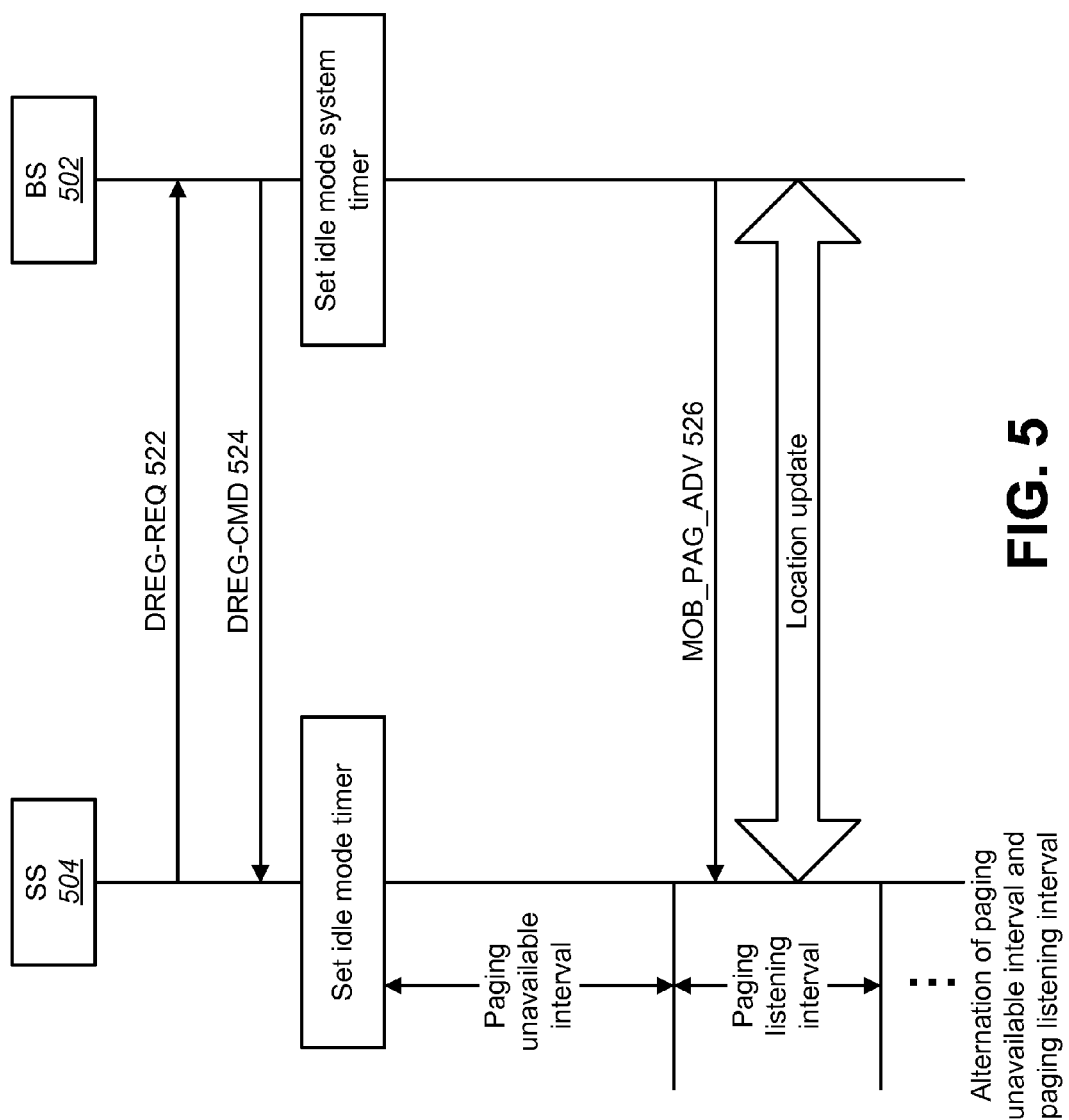
FIG. 5 illustrates various messages that are relevant to idle mode in a WiMAX system.

Reference is now made to FIG. 5. Current WiMAX standards define the following messages relevant to idle mode 212: a deregistration request message (DREG-REQ) 522, a deregistration command message (DREG-CMD) 524, and a paging message (MOB_PAG-ADV) 526.

A DREG-REQ message 522 may be sent by a subscriber station 504 to request deregistration from its serving base station 502 (i.e., initiation of idle mode 212).

A DREG-CMD message 524 may be transmitted by a base station 502 to force the subscriber station 504 to change its state. The base station 502 can transmit the DREG-CMD message 524 in an unsolicited manner or as a response to the DREG-REQ message 522. Upon receiving a DREG-CMD message 524, the subscriber station 504 performs the action indicated by this message 524.

A paging message (MOB_PAG-ADV) 526 is broadcasted or multicasted by a base station 502 during a paging listening interval 418. This message 526 requests the subscriber station 504 to update its location or reenter the network 100.

Figure 6:
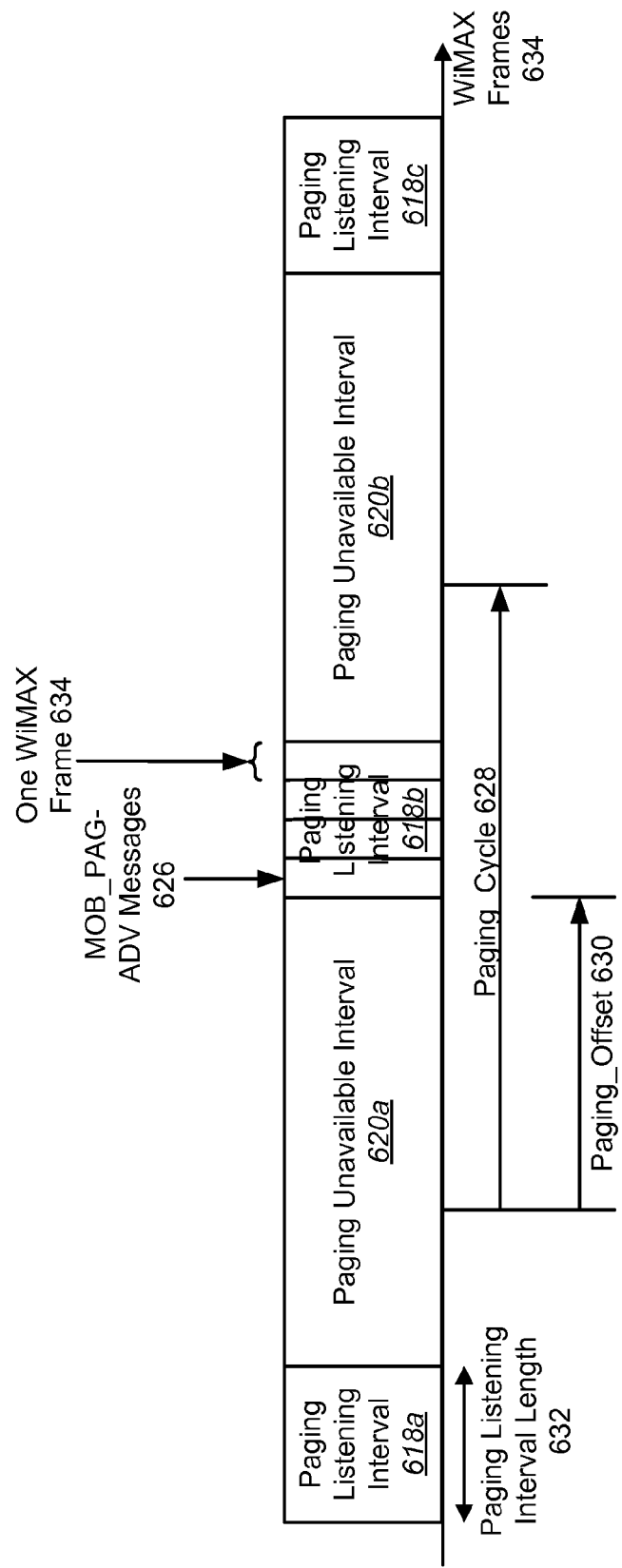
FIG. 6 illustrates various paging parameters that are relevant to idle mode in a WiMAX system.

Reference is now made to FIG. 6. When a subscriber station 104 is in idle mode 212, the subscriber station 104 may listen to the paging messages 626 in certain recurring time intervals. The paging listening interval 618 may be repeated every paging cycle 628. After a paging listening interval 618, another paging unavailable interval 620 begins. The example shown in FIG. 6 includes three paging listening intervals 618a, 618b, 618c and two paging unavailable intervals 620a, 620b.

A paging listening interval 618 may begin from the paging offset 630 frame 634 in every paging cycle 628. A subscriber station 104 may start to listen to the paging message 626 from frame 634 number N when:

$$N \bmod \text{Paging Cycle} = \text{Paging Offset} \quad (1)$$

The length 632 of the paging listening interval 618 may be referred to herein as a paging listening interval length 632. A subscriber station 104 may continue to listen to the paging messages 626 for paging listening interval length 632 frames 634 starting from frame 634 number N.

Exemplary Changing Paging Parameters in Idle Mode

With current WiMAX standards, paging parameters (e.g., paging cycle 628, paging listening interval length 632, paging offset 630) are fixed during the entire period of time that a subscriber station 104 is operating in idle mode 212. These paging parameters may be negotiated when a subscriber station 104 enters idle mode 212. A base station 102 may decide the paging parameters based on the run-time situation at the time when the subscriber station 104 enters idle mode 212. If the base station 102 determines a run-time situation change, it may be beneficial to change paging parameters of some groups of subscriber stations 104 in order for the system 100 to optimize run-time status. Likewise, it may be beneficial for the subscriber station 104 to have a different set of paging parameters according to its own run-time state. However, current WiMAX standards do not provide a mechanism to change paging parameters once the subscriber station 104 enters into idle mode 212. This prevents the system 100 from adjusting paging parameters for best performance.

One aspect of the present disclosure relates to changing paging parameters at some point after a subscriber station 104 has entered idle mode 212. The change(s) to the paging parameter(s) may be initiated by a subscriber station 104 or by a base station 102.

Figure 7:
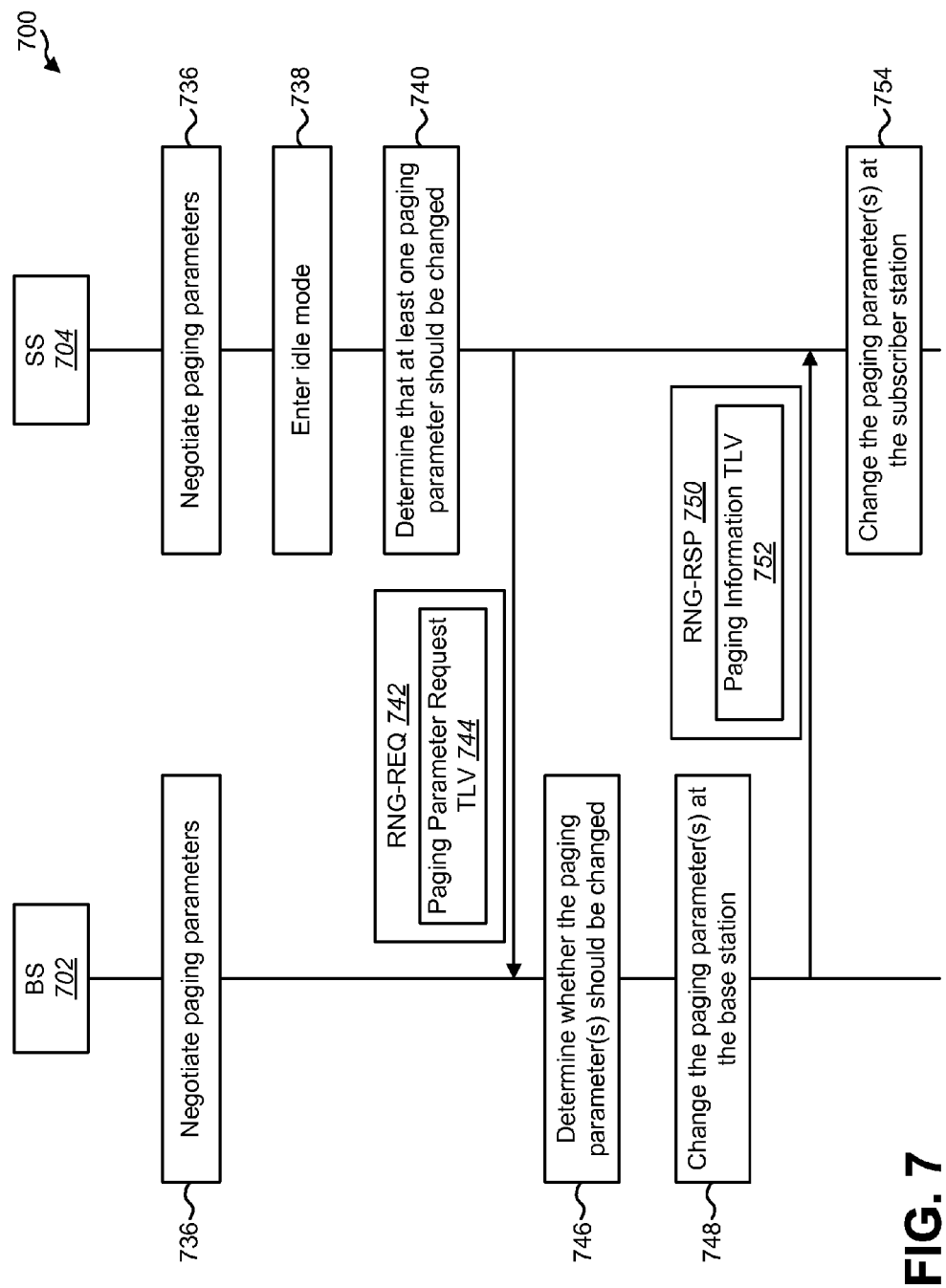
FIG. 7 illustrates an example of a method for changing paging parameters after a subscriber station has entered idle mode, where the subscriber station initiates the change(s)

FIG. 7 illustrates an example of a method 700 for changing paging parameters after a subscriber station 704 has entered idle mode 212, where the subscriber station 704 initiates the change(s). In accordance with the present disclosure, a base station 702 and a subscriber station 704 may negotiate 736 paging parameters so that the subscriber station 704 can enter idle mode 212. At some point after the subscriber station 704 enters 738 idle mode 212, the subscriber station 704 may determine 740 that at least one paging parameter should be changed. The subscriber station 704 may make this determination by evaluating its own run-time state information.

In response to making this determination, the subscriber station 704 may request that the base station 702 change the paging parameter(s). More specifically, the subscriber station 704 may initiate a location update procedure by sending a ranging request (RNG-REQ) message 742 to the base station 702. The RNG-REQ message 742 may include a paging parameter request type-length-value (TLV) 744 that specifies the requested change(s) to the paging parameter(s).

The base station 702 may then determine 746 whether the paging parameter(s) should be changed (e.g., by evaluating system run-time state information) in order to better serve the base station 702 and/or the subscriber station 704. If the base station 702 determines that the paging parameter(s) should be changed, the base station 702 may change 748 the paging parameter(s) at the base station 702. The base station 702 may also direct the subscriber station 704 to change the paging parameter(s) at the subscriber station 704. More specifically, the base station 702 may send a ranging response (RNG-RSP) message 750 to the subscriber station 704. The RNG-RSP message 750 may include a paging information TLV 752 that specifies the change(s) that the subscriber station 704 should make to the paging parameter(s). In response to receiving the RNG-RSP message 750, the subscriber station 704 may change 754 the paging parameter(s) at the subscriber station 704.

Figure 8:
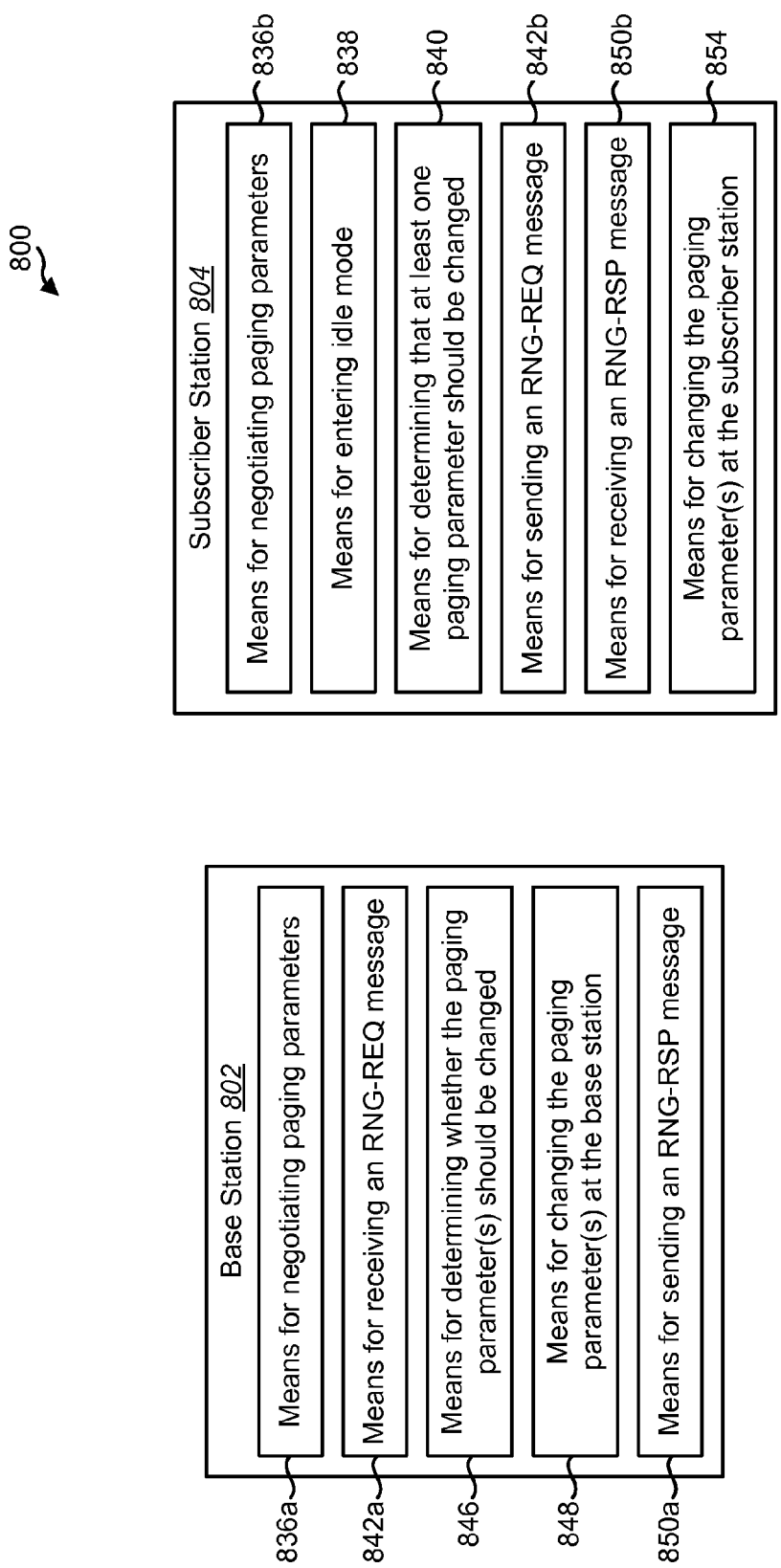
FIG. 8 illustrates means-plus-function blocks corresponding to the method of FIG. 7.

The method 700 of FIG. 7 described above may be performed by various hardware and/or software component(s) and/or module(s) corresponding to the means-plus-function blocks 800 illustrated in FIG. 8. For example, a base station 802 may include means 836*a* for negotiating paging parameters, means 842*a* for receiving an RNG-REQ message 742, means 846 for determining whether the paging parameter(s) should be changed, means 848 for changing the paging parameter(s) at the base station 802, and means 850*a* for sending an RNG-RSP message 750. A subscriber station 804 may include means 836*b* for negotiating paging parameters, means 838 for entering idle mode 212, means 840 for determining that at least one paging parameter should be changed, means 842*b* for sending an RNG-REQ message 742, means 850*b* for receiving an RNG-RSP message 750, and means 854 for changing the paging parameter(s) at the subscriber station 804.

Figure 9:
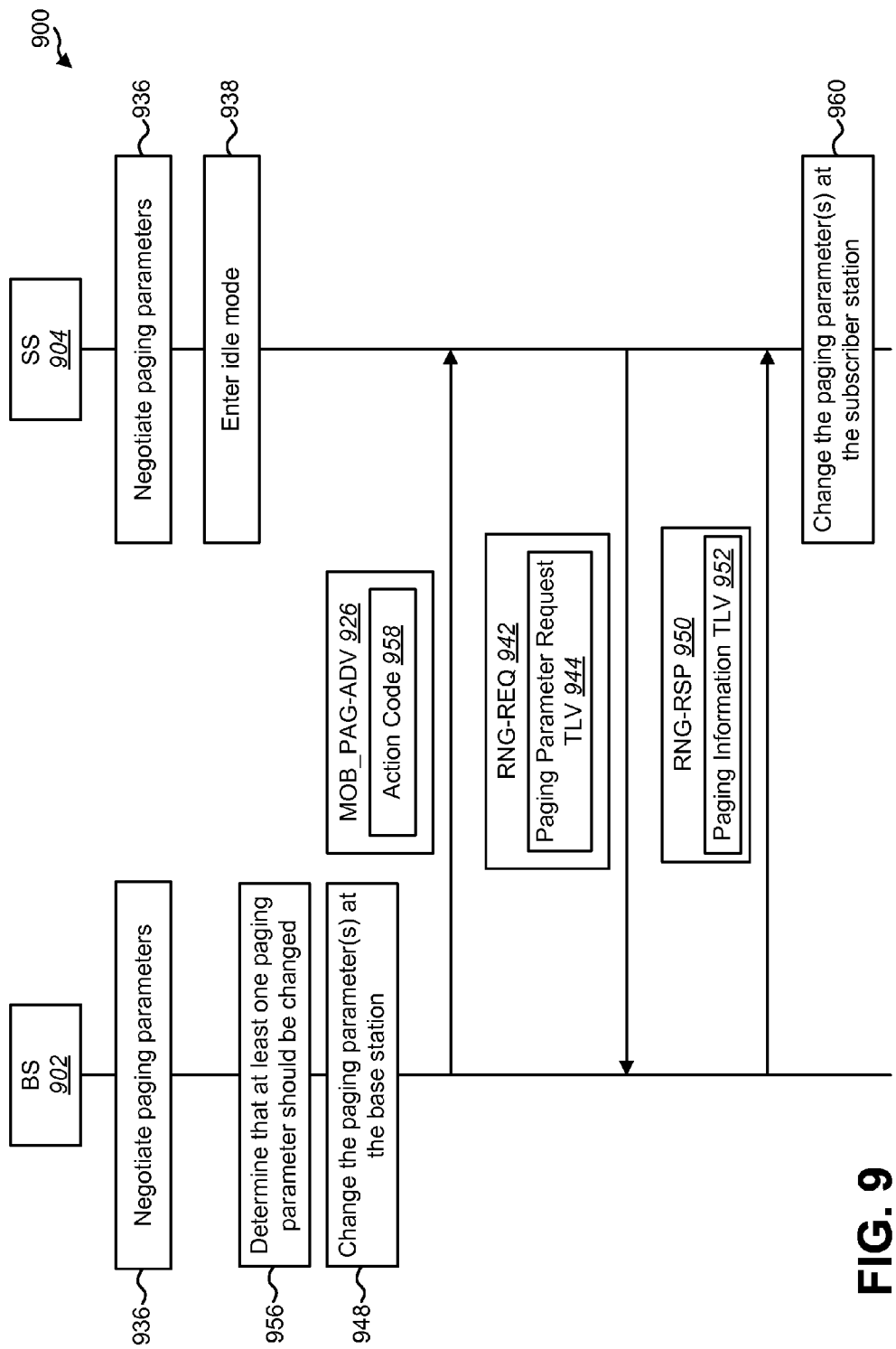
FIG. 9 illustrates an example of a method for changing paging parameters after a subscriber station has entered idle mode, where a base station initiates the change(s)

FIG. 9 illustrates an example of a method 900 for changing paging parameters after a subscriber station 904 has entered idle mode 212, where a base station 902 initiates the change(s).

The base station 902 and the subscriber station 904 may negotiate 936 paging parameters so that the subscriber station 904 can enter 938 idle mode 212. At some point after the subscriber station 904 enters 938 idle mode 212, the base station 902 may determine 956 that at least one paging parameter should be changed in order to better serve the base station 902 and/or the subscriber station 904. The base station 902 may make this determination by evaluating system-wide run-time state information.

The base station 902 may change 948 the paging parameter(s) at the base station 902. The base station 902 may direct the subscriber station 904 to change the paging parameter(s) at the subscriber station 904. More specifically, the base station 902 may request a location update from the subscriber station 904 by sending a paging message 926 to the subscriber station 904 with the action code 958 set to the appropriate value (which is "1" in current WiMAX standards).

In response to receiving the paging message 926, the subscriber station 904 may send an RNG-REQ message 942 to the base station 902. The RNG-REQ message 942 may include a paging parameter request TLV 944 if the subscriber station 904 also wants to request that one or more paging parameters be changed. The base station 902 may send an RNG-RSP message 950 with a paging information TLV 952 that specifies the change(s) that the subscriber station 904 should make to the paging parameter(s). In response to receiving the RNG-RSP message 950, the subscriber station 904 may change 960 the paging parameter(s) at the subscriber station 904.

Figure 10:
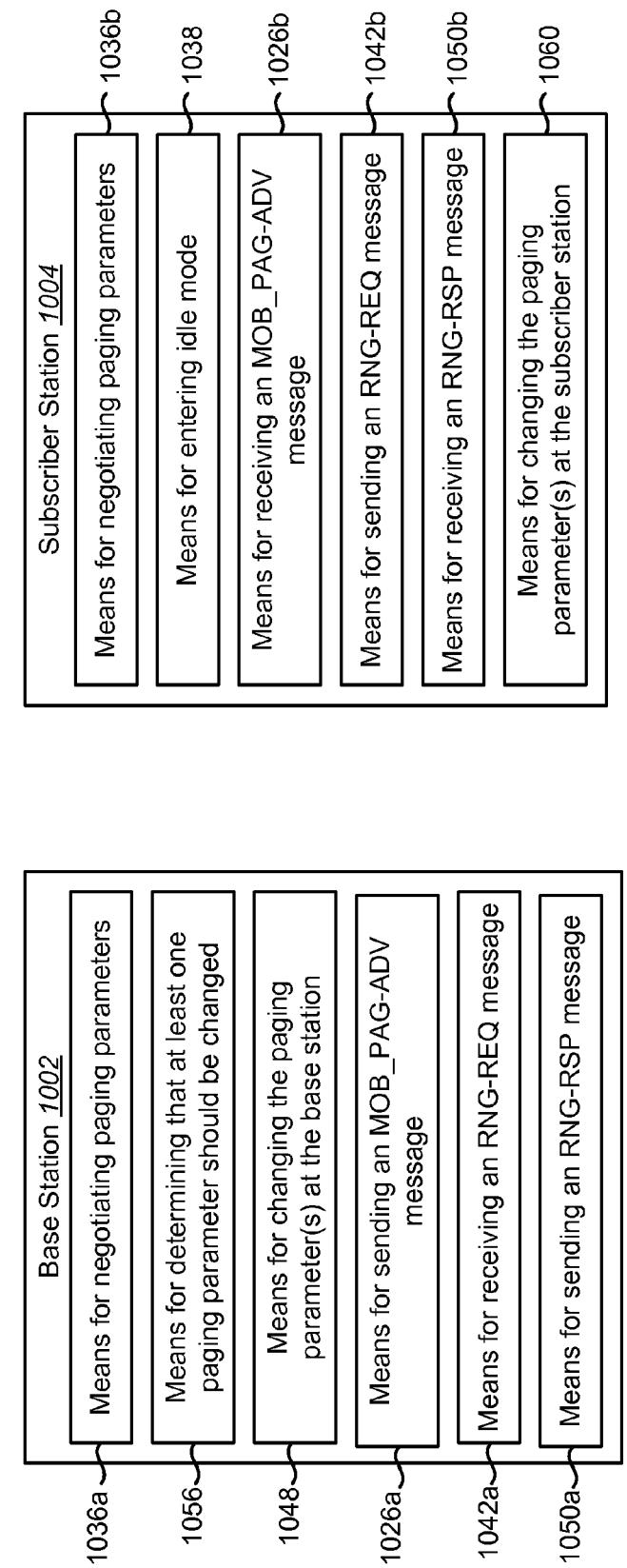
FIG. 10 illustrates means-plus-function blocks corresponding to the method of FIG. 9.

The method 900 of FIG. 9 described above may be performed by various hardware and/or software component(s) and/or module(s) corresponding to the means-plus-function blocks 1000 illustrated in FIG. 10. For example, a base station 1002 may include means 1036*a* for negotiating paging parameters, means 1056 for determining that at least one paging parameter should be changed, means 1048 for changing the paging parameter(s) at the base station 1002, means 1026*a* for sending an MOB_PAG-ADV message 926, means 1042*a* for receiving an RNG-REQ message 942, and means 1050*a* for sending an RNG-RSP message 950. A subscriber station 1004 may include means 1036*b* for negotiating paging parameters, means 1038 for entering idle mode 212, means 1026b for receiving an MOB_PAG-ADV message 926, means 1042b for sending an RNG-REQ message 942, means 1050b for receiving an RNG-RSP message 950, and means 1060 for changing the paging parameter(s) at the subscriber station 1004.

Exemplary Dynamically Changing the Paging Listening Interval Length

The paging listening interval length 632 is an important parameter for idle mode 212 operations. For a subscriber station 104, the shorter paging listening interval length 632, the higher the potential to save power. However, paging listening interval length 632 affects base station 102 differently than subscriber station 104.

Figure 11:
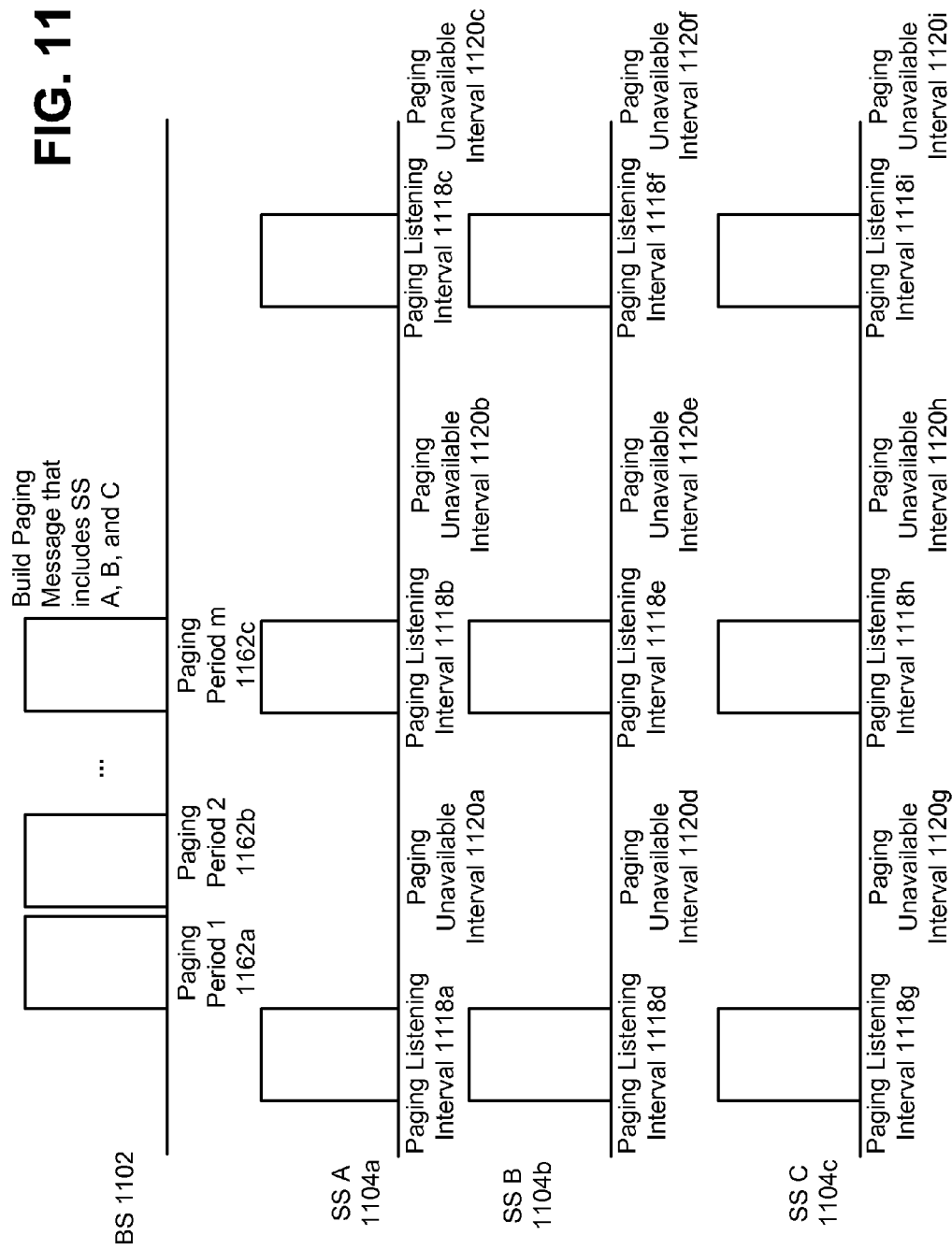
FIG. 11 illustrates examples of paging periods, paging listening intervals, and paging unavailable intervals.

Reference is now made to FIG. 11. There are a few factors to consider when a base station 1102 decides the paging listening interval length 632. These factors will be discussed in relation to FIG. 11, which shows a first subscriber station 1104a, a second subscriber station 1104b, and a third subscriber station 1104c. FIG. 11 also shows paging listening intervals 1118a, 1118b, 1118c and paging unavailable intervals 1120a, 1120b, 1120c for first subscriber station 1104a, paging listening intervals 1118d, 1118e, 1118f and paging unavailable intervals 1120d, 1120e, 1120f for second subscriber station 1104b, and paging listening intervals 1118g, 1118h, 1118i and paging unavailable intervals 1120g, 1120h, 1120i for third subscriber station 1104a. FIG. 11 also shows different paging periods 1162a, 1162b, 1162c for base station 1102.

Because a base station 1102 is supposed to send at least one paging message 526 during a subscriber station's paging listening interval 1118, the paging listening interval 1118 should be long enough for the base station 1102 to send one average-sized paging message 526. Furthermore, the base station 1102 should consider the number of subscriber stations 1104 that should be paged. The more subscriber stations 1104 that should be paged, the bigger the paging message 526 will be. This means that the base station 1102 may not be able to accommodate the same paging period 1162 for too many subscriber stations 1104. Another factor to consider is that with the same paging cycle 628, the base station 1102 cannot allocate too many paging periods 1162. Furthermore, the more paging periods 1162 are allocated, the more bandwidth will be consumed by sending a minimal number of paging messages 526.

While a subscriber station 1104 may prefer to request relatively short paging listening intervals 1118, it may be difficult for the base station 1102 to decide the paging listening interval length 632 at the time of entering idle mode 212 negotiations. If the base station 1102 allocates relatively short paging listening intervals 1118 when the subscriber station 1104 initially enters idle mode 212, later on the system 100 may not have enough paging periods 1162 to handle additional subscriber stations' 1104 requests to go to idle mode 212, and therefore more bandwidth may be consumed to send a minimal number of paging messages 526. However, if the base station 1102 allocates relatively long paging listening intervals 1118 when the subscriber station 1104 initially enters idle mode 212, then this does not serve the interests of the subscriber station 1104 in terms of power saving.

In accordance with the present disclosure, the paging listening interval length 632 may be adjustable at run time according to the loading situation changes on the base station 1102 side. Stated another way, the paging listening interval length 632 may be dynamically adjustable based on the situation at the base station 1102. With this approach, both the subscriber station 1104 and the base station 1102 can get an optimized allocation of paging listening intervals 1118.

Figure 12:
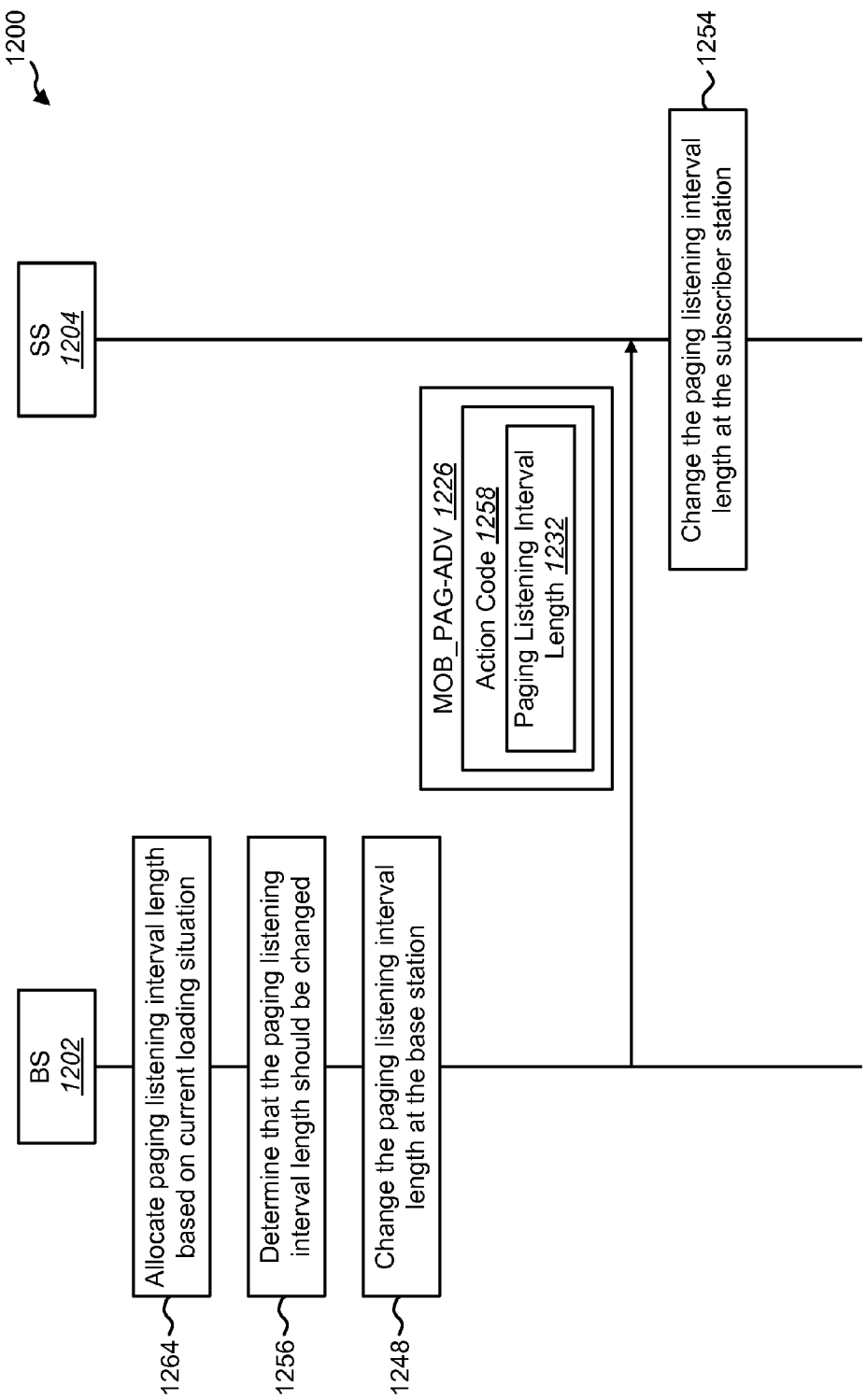
FIG. 12 illustrates a method for changing the paging listening interval length after a subscriber station has entered idle mode.

Reference is now made to FIG. 12. When a base station 1202 and a subscriber station 1204 are negotiating idle mode 212 parameters, the base station 1202 may first allocate 1264 the paging listening interval length 1232 based on its current loading situation. Later on, if the base station 1202 experiences a load change or other run-time environmental change, it may determine 1256 that the paging listening interval length 1232 for one or more subscriber stations 1204 should be changed. For example, when the loading of the base station 1202 is high, the base station 1202 may increase the paging listening interval length 1232. When the loading of the base station 1202 decreases, the base station 1202 may decrease the paging listening interval length 1232. The base station 1202 may change 1248 the paging listening interval length 1232 at the base station 1202, and may direct the subscriber station 1204 to change the paging listening interval length 1232 by sending a paging message 1226 that includes a new value for the paging listening interval length 1232. In response to receiving the paging message 1226, the subscriber station 1204 may change 1254 the paging listening interval length 1232 at the subscriber station 1204.

In accordance with current WiMAX standards, the paging message 1226 has an 8-bit action code 1258. However, only 2 bits are presently used. The remaining 6 bits are reserved. The following is an example of how these remaining 6 bits may be used in accordance with the present disclosure:

Bit 5: If the value of bit 5 is "0", then this may mean that no new paging listening interval length 1232 is assigned for the subscriber station 1204 with the MAC address hash in this paging message 1226. This bit may be set to be "0" to make it backwards compatible with old versions of the WiMAX standard. If the value of bit 5 is "1", then this may mean that a new paging listening interval length 1232 is assigned for the subscriber station 1204 with the MAC address hash in this paging message 1226.

Bits 4-2: If the value of bit 5 is "1", bits 4 through bit 2 may form the value of the new paging listening interval length 1232 in binary format. The new paging listening interval length 1232 may take effect starting from the next paging listening interval 1118. For example, if bits 4 through bit 2 are 101, then in this example the new paging listening interval length 1232 may be is 5 frames 1232, starting the next paging listening interval 1118.

Bits 1 and 0 may be left as reserved.

The method 1200 of FIG. 12 represents one possible implementation of the method 900 of FIG. 9. As discussed above, the method 900 of FIG. 9 involves a base station 902 determining 956 that at least one paging parameter should be changed after the subscriber station 904 has entered idle mode 212, changing 948 the paging parameter(s) at the base station 902, and directing the subscriber station 904 to change the paging parameter(s) at the subscriber station 904. In the method 1200 of FIG. 12, the paging parameter that is being changed is the paging listening interval length 1232. The base station 1202 directs the subscriber station 1204 to change the paging listening interval length 1232 by sending a paging message 1226 that includes a new value for the paging listening interval length 1232.

Figure 13:
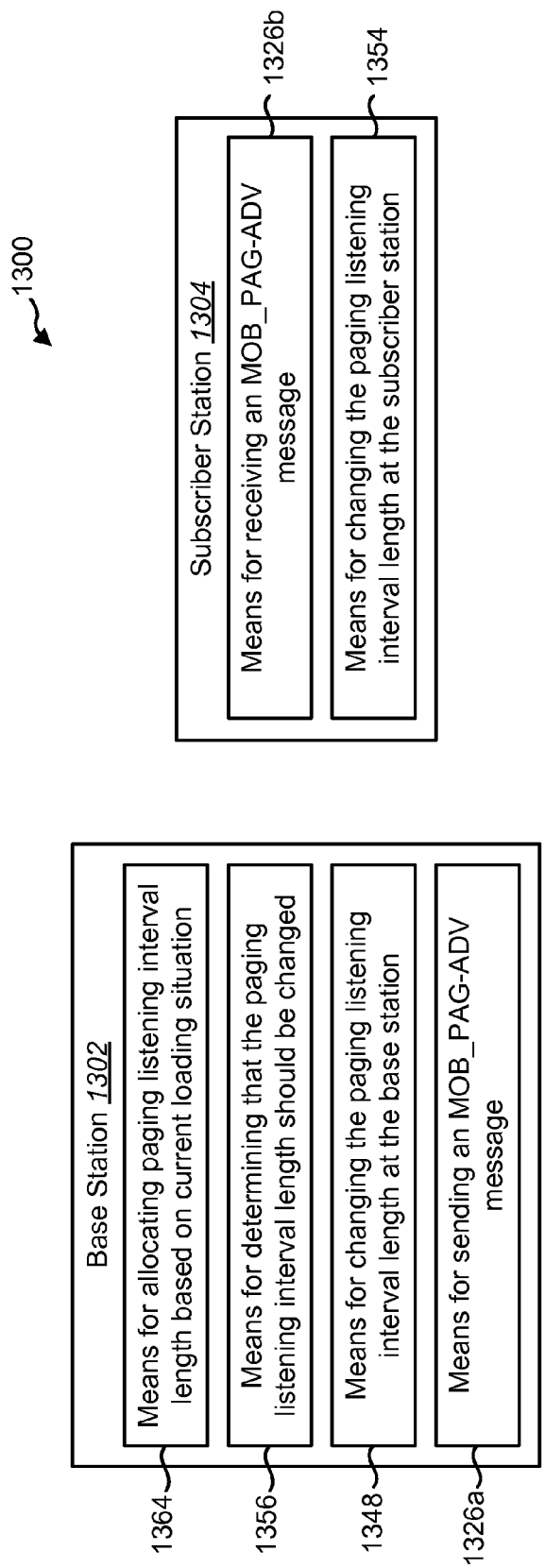
FIG. 13 illustrates means-plus-function blocks corresponding to the method of FIG. 12.

The method 1200 of FIG. 12 described above may be performed by various hardware and/or software component(s) and/or module(s) corresponding to the means-plus-function blocks 1300 illustrated in FIG. 13. For example, a base station 1302 may include means 1364 for allocating paging listening interval length 1232 based on current loading situation, means 1356 for determining that the paging listening interval length 1232 should be changed, means 1348 for changing the paging listening interval length 1232 at the base station 1302, and means 1326a for sending an MOB_PAG-ADV message 1226. A subscriber station 1304 may include means 1326b for receiving an MOB_PAG-ADV message 1226, and means 1354 for changing the paging listening interval length 1232 at the subscriber station 1304.

Exemplay Dynamic Paging Cycles in Idle Mode

The paging cycle 628 can affect the latency to exit idle mode 212 and resume traffic operation when there is downlink data pending at the base station 102. However, when a subscriber station 104 starts to enter idle mode 212, it is likely that downlink data can arise shortly. It may be beneficial if the subscriber station 104 can quickly return to normal mode 214. Another aspect of the present disclosure relates to dynamically increasing the paging cycle 628 in order to reduce the latency in returning to normal mode 214 after the subscriber station 104 enters the idle mode 212.

Figure 14:
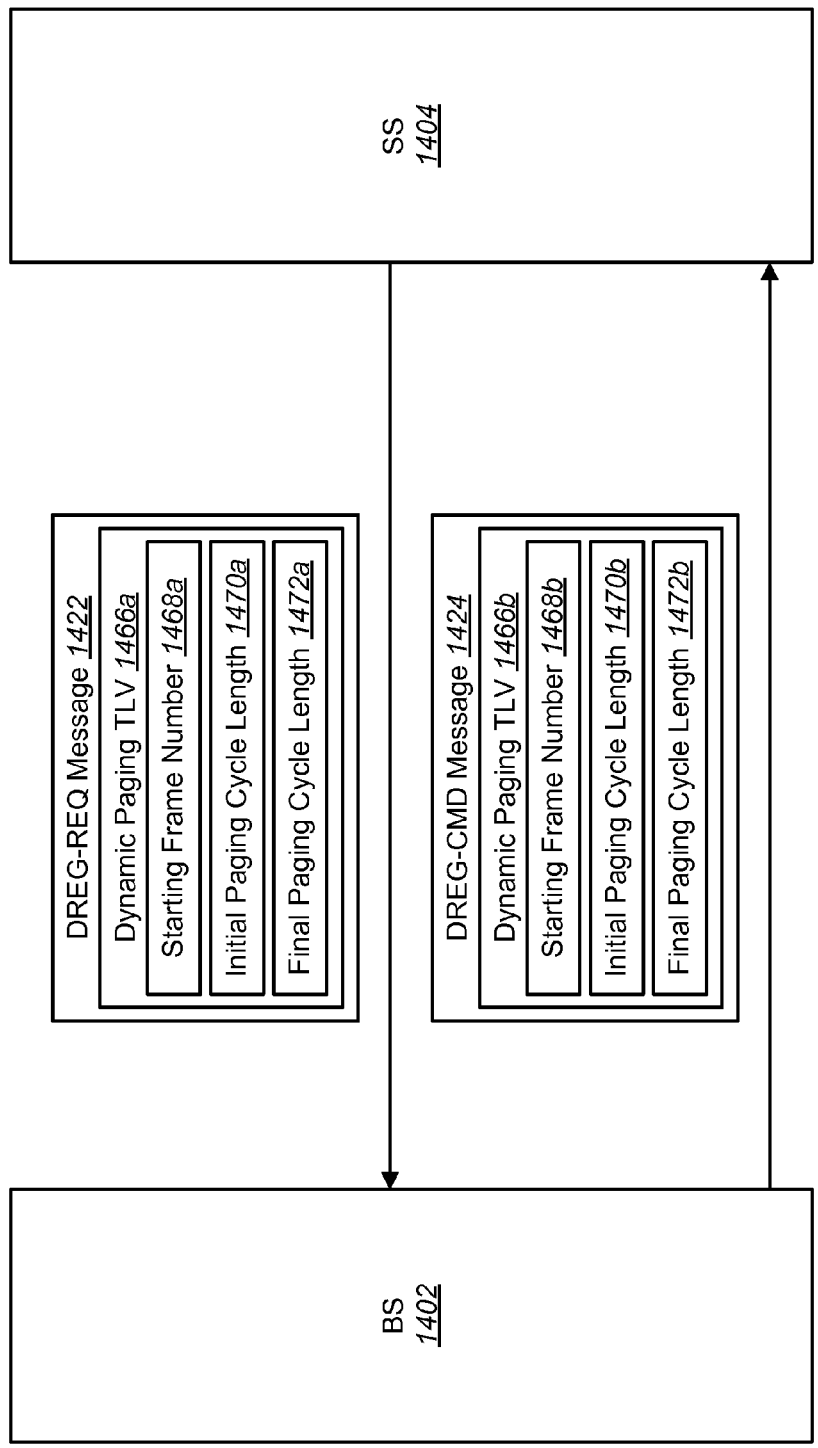
FIG. 14 illustrates deregistration request (DREG-REQ) and deregistration command (DREG-CMD) messages that include a dynamic paging type-length-value (TLV)

Reference is now made to FIG. 14. The present disclosure proposes to include a new dynamic paging TLV 1466 in the DREG-REQ message 1422 and in the DREG-CMD message 1424 that are exchanged by a base station 1402 and a subscriber station 1404.

The dynamic paging TLV 1466 may include the starting frame number 1468 of the first paging listening interval 418, the initial paging cycle length 1470, and the final paging cycle length 1472. The starting frame number 1468 may include only the least significant 8 bits of the starting frame number of the first paging listening interval 418. The initial paging cycle length 1470 and the final paging cycle length 1472 may both be represented in units of frames. The initial paging cycle length 1470 may be 8 bits, and the final paging cycle length 1472 may be 16 bits.

FIG. 14 shows a dynamic paging TLV 1466a in the DREG-REQ message 1422. This dynamic paging TLV 1466a includes a starting frame number 1468a, an initial paging cycle length 1470a, and a final paging cycle length 1472a. FIG. 14 also shows a dynamic paging TLV 1466b in the DREG-CMD message 1424. This dynamic paging TLV 1466b includes a starting frame number 1468b, an initial paging cycle length 1470b, and a final paging cycle length 1472b.

Figure 15:
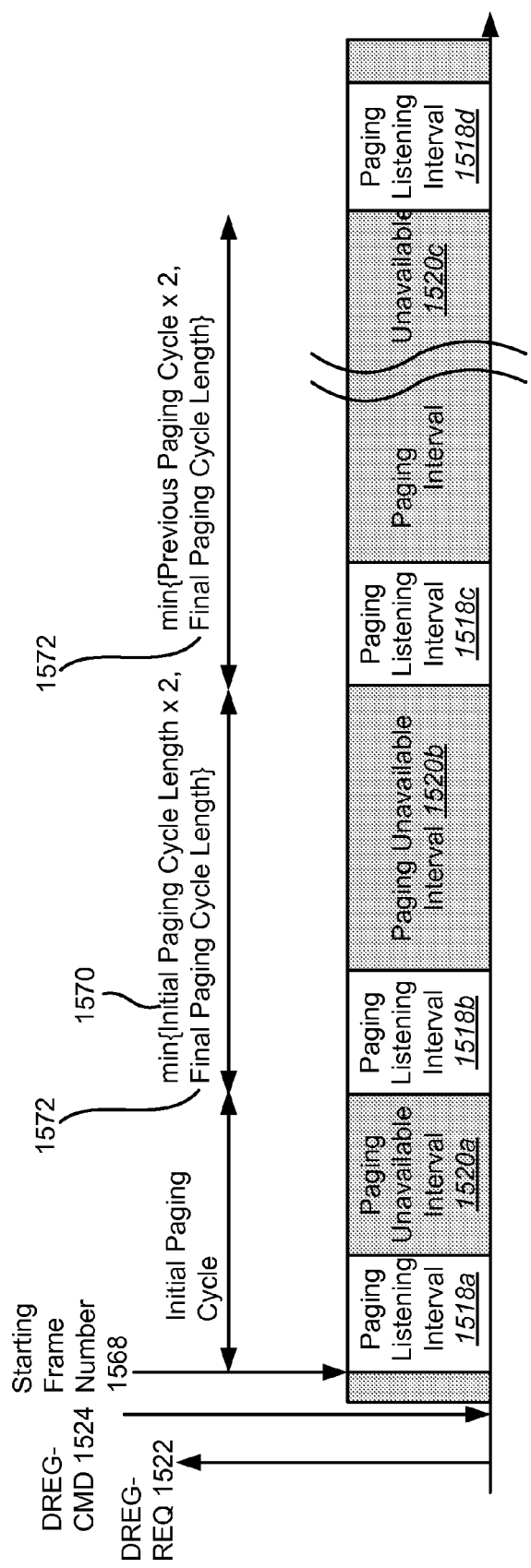
FIG. 15 illustrates an example showing how the paging cycle may be dynamically increased in accordance with the present disclosure.

Reference is now made to FIG. 15. After the subscriber station 1404 and the base station 1402 complete handshaking using the DREG-REQ message 1522 and the DREG-CMD message 1524, the subscriber station 1404 may enter the idle mode 212 immediately. The subscriber station 1404 may start the first paging listening interval 1518a when the least significant 8 bits of the next absolute frame number is equal to the starting frame number 1568 specified in the DREG-REQ message 1522 and the DREG-CMD message 1524.

When the first paging listening interval 1518a completes, the subscriber station 1404 may begin the first paging unavailable interval 1520a. The next paging listening interval 1518b may start initial paging cycle length 1570 frames after the start of the first paging listening interval 1518a. When the second paging listening interval 1518b completes, the subscriber station 1404 may begin the second paging unavailable interval 1520b. The third paging listening interval 1518c may start min{Initial Paging Cycle Length×2, Final Paging Cycle Length} frames after the start of the second paging listening interval 1518b.

In general, when a paging listening interval 1518c completes, the subscriber station 1404 may begin a paging unavailable interval 1520c, and the next paging listening interval 1518d may start min{Previous Paging Cycle Length×2, Final Paging Cycle Length} frames after the start of the previous paging listening interval 1518c.

Figure 16:
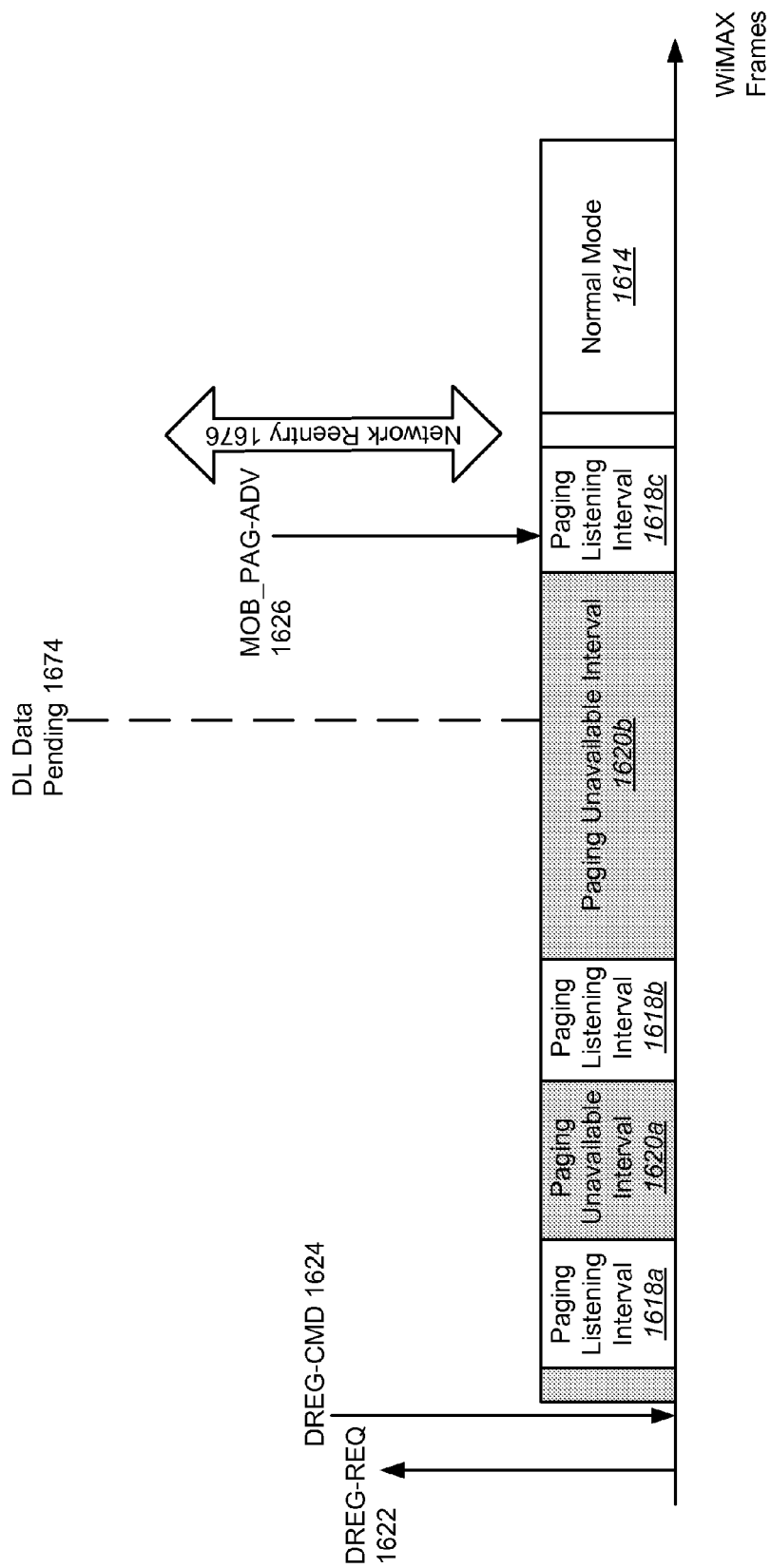
FIG. 16 illustrates another example showing how the paging cycle may be dynamically increased in accordance with the present disclosure.

Reference is now made to FIG. 16, which illustrates an example showing how a subscriber station 1404 may quickly resume traffic operation after entering idle mode 212. A base station 1402 and a subscriber station 1404 may exchange DREG-REQ 1622 and DREG-CMD 1624 messages, at which point the subscriber station 1404 may enter idle mode 212. At some point after entering idle mode 212, the subscriber station 1404 may enter a first paging listening interval 1618a, followed by a first paging unavailable interval 1620a, followed by a second paging listening interval 1618b, followed by a second paging unavailable interval 1620b. The second paging unavailable interval 1620b may be longer than the first paging unavailable interval 1620a, due to dynamically increasing paging cycles 628. Downlink data 1674 for the subscriber station 1404 may arrive at the base station 1402 during the second paging unavailable interval 1620b. During a third paging listening interval 1618c, the base station 1402 may send a paging message 1626 to the subscriber station 1404, notifying the subscriber station 1404 about the pending downlink data 1674. The subscriber station 1404 may then perform network re-entry 1676, and return to normal mode 1614.

With dynamically increasing paging cycles 628, the subscriber station 1404 may quickly resume traffic operation after entering idle mode 212. In addition, the long term power saving benefits of idle mode 212 may be maintained.

The method described above in connection with FIGS. 15 and 16 represents one possible implementation of the method 900 of FIG. 9. As discussed above, the method 900 of FIG. 9 involves a base station 902 determining 956 that at least one paging parameter should be changed after the subscriber station 904 has entered idle mode 212, changing 948 the paging parameter(s) at the base station 902, and directing the subscriber station 904 to change the paging parameter(s) at the subscriber station 904. In the method described above in connection with FIGS. 15 and 16, the paging parameter that is being changed is the paging cycle 628, and more specifically, the length of the paging cycle 628. The base station 1402 directs the subscriber station 1404 to change the length of the paging cycle 628 by exchanging DREG-REQ 1522 and DREG-CMD 1524 messages with the subscriber station 1404. As indicated above, the DREG-REQ 1522 and DREG-CMD 1524 messages include the starting frame number 1568, the initial paging cycle length 1570, and the final paging cycle length 1572.

Figure 17:
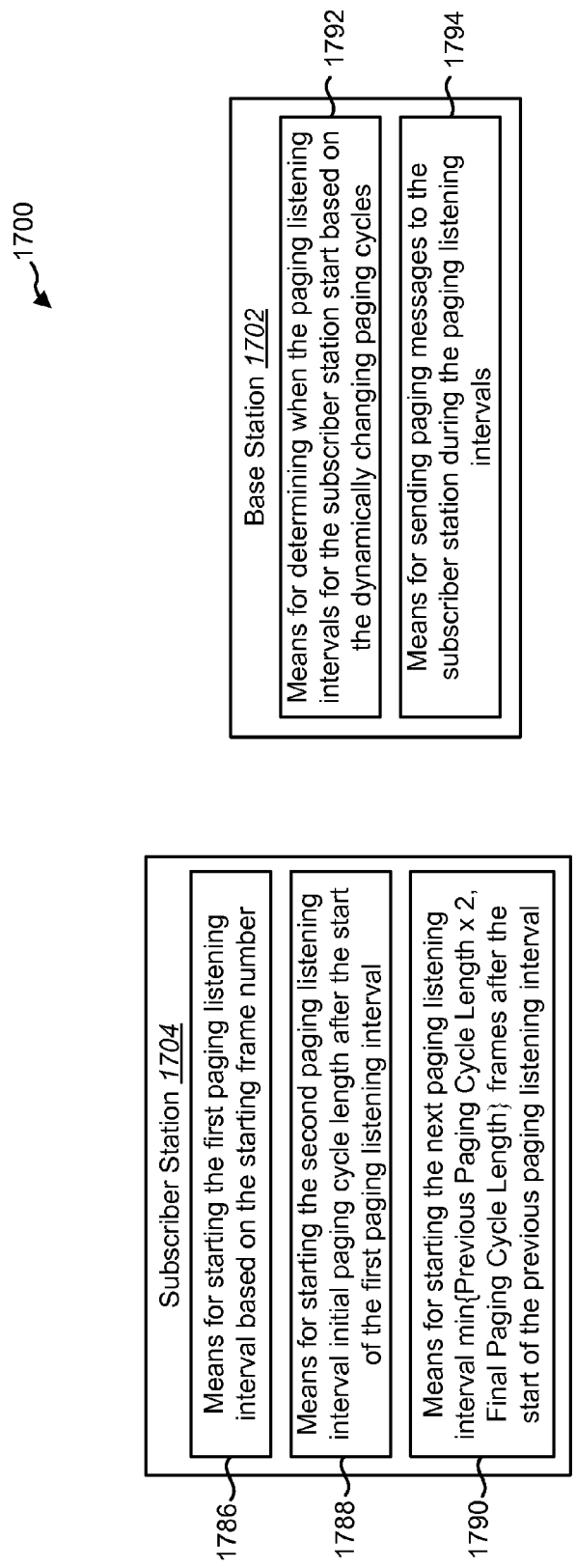
FIG. 17 illustrates means-plus-function blocks corresponding to the methods illustrated in FIGS. 15-16.

The method described above in connection with FIGS. 15 and 16 may be performed by various hardware and/or software component(s) and/or module(s) corresponding to the means-plus-function blocks 1700 illustrated in FIG. 17. For example, a subscriber station 1704 may include means 1786 for starting the first paging listening interval 1518a based on the starting frame number 1568 in the DREG-REQ 1522 and DREG-CMD 1524 messages, means 1788 for starting the second paging listening interval 1518b initial paging cycle length 1570 frames after the start of the first paging listening interval 1518a, and means 1790 for starting the next paging listening interval 1518d min{Previous Paging Cycle Length× 2, Final Paging Cycle Length} frames after the start of the previous paging listening interval 1518c. A base station 1702 may include means 1792 for determining when the paging listening intervals 1518 for the subscriber station 1704 start based on the dynamically changing paging cycles 628, and means 1794 for sending paging messages 1626 to the subscriber station 1704 during the paging listening intervals 1518.

Exemplary Overload Control for Paging Offset Resources

Current WiMAX standards allow the subscriber station 104 to propose the paging cycle 628 in the DREG-REQ message 522. However, current WiMAX standards only allow the base station 102 to choose the paging offset 630 and the paging listening interval length 632 in the DREG-CMD message 524. The paging cycle 628 can be decided by the level of power saving and delay to deliver the initial subscriber station-destined data when the subscriber station 104 is idle mode 212. However, current WiMAX standards do not specify how to select paging offset 630. Another aspect of the present disclosure relates to selecting paging offset 630 for idle mode 212 subscriber station 104 in WiMAX systems 100 to reduce the chance of overload.

One objective in selecting the paging offset 630 for the subscriber station 104 that is requesting to enter idle mode 212 is to balance the loading of sending the paging messages 526. For example, when too many idle mode 212 subscriber stations 104 are scheduled to receive the paging messages 526 at the same paging offset 630, sending paging messages 526 may result in overload. Therefore the base station 102 may send paging messages 526 in future paging cycles 628 to prevent the situation where too many paging messages 526 have to be transmitted in the current paging cycle 628. The delay for sending paging messages 526 will increase accordingly. To achieve the objective of balancing the loading of sending the paging messages 526, the present disclosure proposes two methods to select the paging offset 630: static and dynamic.

Figure 18:
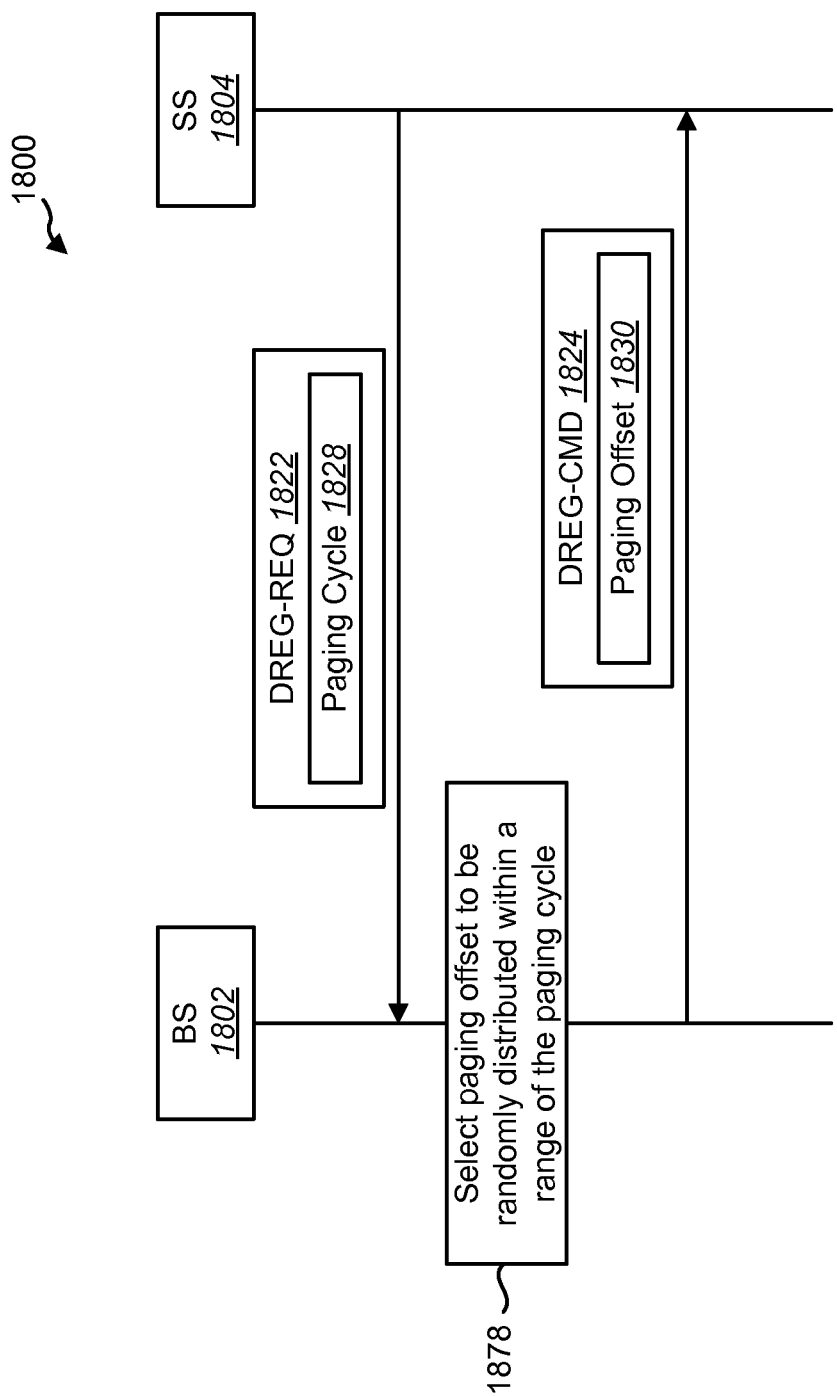
FIG. 18 illustrates a static method for selecting a paging offset in accordance with the present disclosure.

Reference is now made to FIG. 18, which illustrates a static method 1800 for selecting the paging offset 1830 in accordance with the present disclosure. A subscriber station 1804 may send a DREG-REQ message 1822 to a base station 1802. The DREG-REQ message 1822 may include a request for a particular paging cycle 1828. The base station 1802 may select 1878 the paging offset 1830 so that the paging offset 1830 is randomly distributed within a range of the requested paging cycle 1828. For example, the base station 1802 may run a random number U among [0,1). The base station 1802 may select the paging offset 1830 as:

$$\text{Paging\_Offset} = \text{FLOOR}(U * \text{Paging\_Cycle}) \quad (2)$$

The above y=FLOOR(x) function returns the value y equal to the maximum integer not greater than value x.

Therefore, the paging offset 1830 may be selected to be randomly distributed in the range of the requested paging cycle 1828. The base station 1802 may notify the subscriber station 1804 about the selected paging offset 1830 by sending a DREG-CMD message 1824 to subscriber station 1804 that includes selected paging offset 1830.

Figure 19:
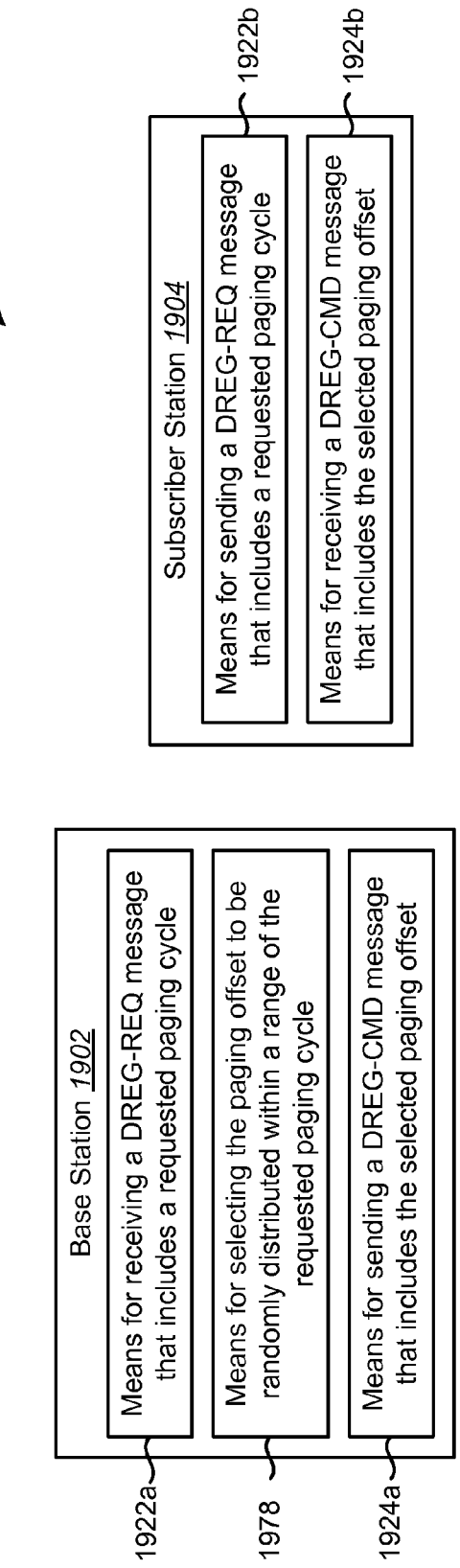
FIG. 19 illustrates means-plus-function blocks corresponding to the method of FIG. 18.

The method 1800 of FIG. 18 described above may be performed by various hardware and/or software component(s) and/or module(s) corresponding to the means-plus-function blocks 1900 illustrated in FIG. 19. For example, a base station 1902 may include means 1922a for receiving a DREG-REQ message 1822 that includes a requested paging cycle 1828, means 1978 for selecting the paging offset 1830 to be randomly distributed within a range of the requested paging cycle 1828, and means 1924a for sending a DREG-CMD message 1824 that includes the selected paging offset 1830. A subscriber station 1904 may include means 1922b for sending a DREG-REQ 1822 message that includes a requested paging cycle 1828, and means 1924b for receiving a DREG-CMD message 1824 that includes the selected paging offset 1830.

Reference is now made to FIG. 20, which illustrates a dynamic method 2000 for selecting the paging offset 630 in accordance with the present disclosure. The dynamic method 2000 for selecting the paging offset 630 makes the following two assumptions. First, it is assumed that the paging cycle 628 can only be allowed if it can divide the maximum paging cycle value in a WiMAX system 100. That is, Paging_Cycle=P/n, where n is a positive integer, and P is the maximum paging cycle value for a WiMAX system 100. Second, it is assumed that the paging offset 630 resource is available per paging group 316 (which, as indicated above, is a group of base stations 102). The paging offset 630 resource is managed by the ASN-GW (Access Service Network-Gateway).

In accordance with the present disclosure, an ASN-GW may maintain 2080 the paging offset 630 utilization status k(i). That is, k(i), i=0, . . . , P−1, where k(i) is the number of subscriber stations 104 using this paging offset 630 value i for a particular paging group 316.

The ASN-GW may add a subscriber station 104 with Paging_Cycle=P/n and Paging_Offset=j to the paging offset 630 utilization status if the subscriber station 104 has registered its location through some base station 102 for a particular paging group 316. That is:

$$k(i)=k(i)+1, \text{if } i=j, j+P/n, j+2*P/n, \ldots, j+(n-1)*P/n \quad (3)$$

The ASN-GW may delete a subscriber station 104 from the paging offset 630 utilization status if the subscriber station 104 no longer updates its location with any of the base stations 102 in a particular paging group 316 or the subscriber station 104 is unreachable in paging for the base stations 102 in the paging group 316. That is:

$$k(i)=k(i)-1, \text{if } i=j, j+P/n, j+2*P/n, \ldots, j+(n-1)*P/n \quad (4)$$

In response to a subscriber station 104 requesting to enter idle mode 212, the ASN-GW may calculate 2082 loading of individual paging offset 630 values L(i) for the paging group 316 based on the utilization status and a paging cycle 628 that is requested by the subscriber station 104. That is:

$$L(i)=k(i)+k(i+P/n)+k(i+2*P/n)+\ldots+k(i+(n-1)*P/n),$$
$$i=0,\ldots,P/n-1 \quad (5)$$

The ASN-GW may select 2084 the least loaded paging offset 630 value v (0≦i≦P/n−1) that can meet the following condition:

$$L(v) \leq L(i), \text{for } 0 \leq i \leq P/n-1 \quad (6)$$

If multiple paging offset 630 values satisfy these requirements, the ASN-GW may randomly choose the paging offset 630 value.

To illustrate this method 2000, the following example will be provided. Assume that a paging group 316 has four subscriber stations 104 that regularly update their locations:

SS1: Paging_Offset=2, Paging_Cycle=8
SS2: Paging_Offset=1, Paging_Cycle=4
SS3: Paging_Offset=2, Paging_Cycle=4
SS4: Paging_Offset=3, Paging_Cycle=4

Further assume that the maximum Paging_Cycle=8 is for this paging group 316.

When a subscriber station 104 requests to enter idle mode 212 through a base station 102 in this paging group 316, with Paging_Cycle=4 or 8/2, the ASN-GW can calculate as shown in the following table:

TABLE 2

| | i = 0 | i = 1 | i = 2 | i = 3 | i = 4 | i = 5 | i = 6 | i = 7 |
|---|---|---|---|---|---|---|---|---|
| SS1 | | | 1 | | | | | |
| SS2 | | 1 | | | | 1 | | |

TABLE 2-continued

| | i = 0 | i = 1 | i = 2 | i = 3 | i = 4 | i = 5 | i = 6 | i = 7 |
|---|---|---|---|---|---|---|---|---|
| SS3 | | | 1 | | | | 1 | |
| SS4 | | | | 1 | | | | 1 |
| k(i) | 0 | 1 | 2 | 1 | 0 | 1 | 1 | 1 |
| L(i) | 0 | 2 | 3 | 2 | | | | |

Therefore, the ASN-GW may allocate Paging_Offset v=0 for this subscriber station 104 because L(0)<L(1), L(2), and L(3) in this case.

Both the static and dynamic methods can allocate paging offsets 630 to spread paging message 526 load. Each can reduce the chance of overload and improve the delay performance of sending the paging messages 526 in WiMAX systems 100.

The method 2000 of FIG. 20 described above may be performed by various hardware and/or software component(s) and/or module(s) corresponding to the means-plus-function blocks 2100 illustrated in FIG. 21. In other words, blocks 2080 through 2084 illustrated in FIG. 20 correspond to means-plus-function blocks 2180 through 2184 illustrated in FIG. 21.

Figure 22:
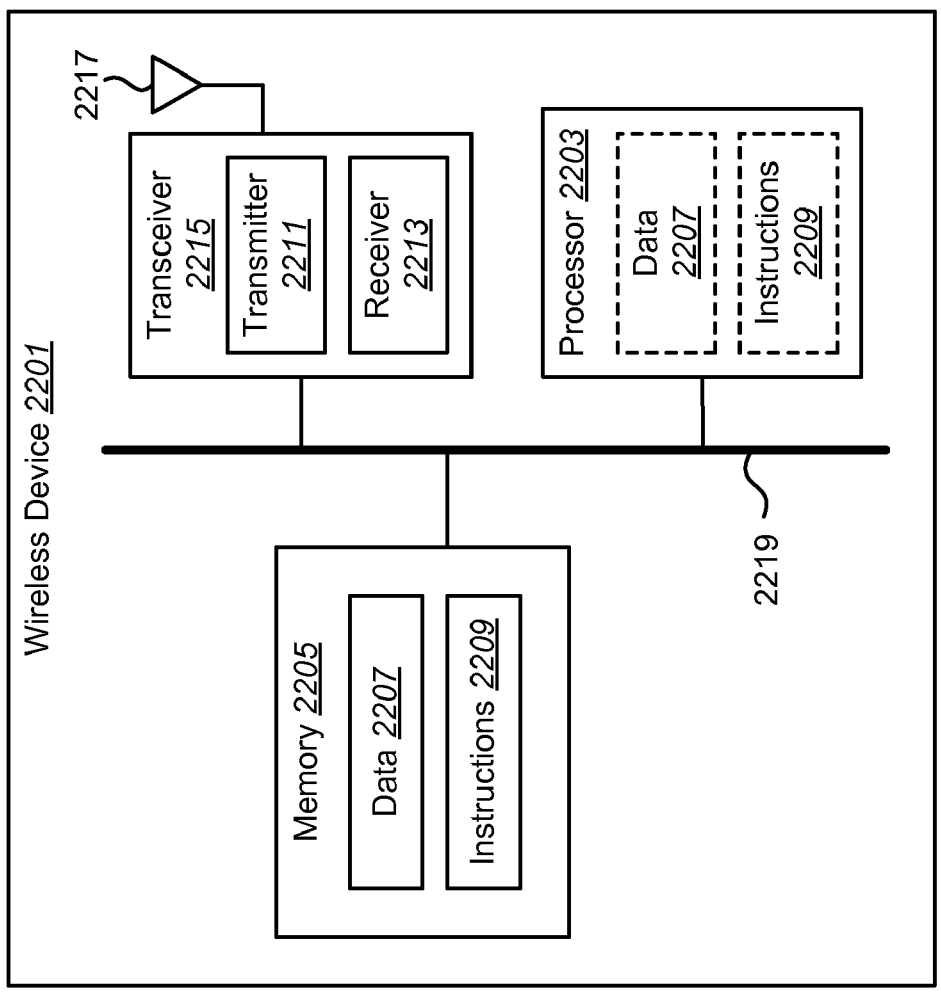
FIG. 22 illustrates certain components that may be included within a wireless device.

FIG. 22 illustrates certain components that may be included within a wireless device 2201. The wireless device 2201 may be a subscriber station 104, a base station 102, an ASN-GW, etc.

The wireless device 2201 includes a processor 2203. The processor 2203 may be a general purpose single- or multi-chip microprocessor (e.g., an ARM), a special purpose microprocessor (e.g., a digital signal processor (DSP)), a microcontroller, a programmable gate array, etc. The processor 2203 may be referred to as a central processing unit (CPU). Although just a single processor 2203 is shown in the wireless device 2201 of FIG. 22, in an alternative configuration, a combination of processors (e.g., an ARM and DSP) could be used.

The wireless device 2201 also includes memory 2205. The memory 2205 may be any electronic component capable of storing electronic information. The memory 2205 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 2207 and instructions 2209 may be stored in the memory 2205. The instructions 2209 may be executable by the processor 2203 to implement the methods disclosed herein. Executing the instructions 2209 may involve the use of the data 2207 that is stored in the memory 2205.

The wireless device 2201 may also include a transmitter 2211 and a receiver 2213 to allow transmission and reception of signals between the wireless device 2201 and a remote location. The transmitter 2211 and receiver 2213 may be collectively referred to as a transceiver 2215. An antenna 2217 may be electrically coupled to the transceiver 2215. The wireless device 2201 may also include (not shown) multiple transmitters, multiple receivers, multiple transceivers and/or multiple antenna.

The various components of the wireless device 2201 may be coupled together by one or more buses, which may include a power bus, a control signal bus, a status signal bus, a data bus, etc. For the sake of clarity, the various buses are illustrated in FIG. 22 as a bus system 2219.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to/from the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The term "computer-readable medium" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 7, 9, 12, 15-16, 18 and 20, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for changing paging parameters in idle mode, the method being implemented by a base station, the method comprising:
   negotiating the paging parameters with a subscriber station so that the subscriber station can enter the idle mode;
   changing at least one paging parameter at the base station after the subscriber station has entered the idle mode; and
   directing the subscriber station to change the at least one paging parameter at the subscriber station after the subscriber station has entered the idle mode, wherein directing the subscriber station to change the at least one paging parameter comprises:
      requesting a location update from the subscriber station;
      receiving a ranging request (RNG-REQ) message from the subscriber station; and
      sending a ranging response (RNG-RSP) message to the subscriber station, wherein the RNG-RSP message comprises a paging information type-length-value that specifies a change to the at least one paging parameter.

2. The method of claim 1, further comprising receiving a request from the subscriber station to change the at least one paging parameter.

3. The method of claim 1, wherein the RNG-REQ message comprises a paging parameter request type-length-value (TLV) that specifies a requested change to the at least one paging parameter.

4. The method of claim 1, wherein the at least one paging parameter comprises a paging listening interval length, wherein directing the subscriber station to change the paging listening interval length comprises sending a paging message to the subscriber station, and wherein the paging message comprises a new value for the paging listening interval length.

5. A method for changing paging parameters in idle mode, the method being implemented by a base station, the method comprising:
   negotiating the paging parameters with a subscriber station so that the subscriber station can enter the idle mode;
   changing at least one paging parameter at the base station after the subscriber station has entered the idle mode; and
   directing the subscriber station to change the at least one paging parameter at the subscriber station after the subscriber station has entered the idle mode, wherein the at least one paging parameter comprises a paging cycle, and wherein changing the paging cycle comprises dynamically increasing the paging cycle, wherein directing the subscriber station to dynamically increase the paging cycle comprises exchanging deregistration request (DREG-REQ) and deregistration command (DREG-CMD) messages with the subscriber station, wherein the DREG-REQ and DREG-CMD messages comprise a starting frame number, an initial paging cycle length, and a final paging cycle length.

6. A method for changing paging parameters in idle mode, the method being implemented by a subscriber station, the method comprising:
   negotiating the paging parameters with a base station so that the subscriber station can enter idle mode;
   after the subscriber station has entered the idle mode, requesting that the base station change the at least one paging parameter at the base station;
   requesting directions from the base station to change at least one paging parameter at the subscriber station, wherein requesting directions from the base station to change at least one paging parameter at the subscriber station comprises sending a ranging request (RNG-REQ) message to the base station, wherein the RNG-REQ message comprises a paging parameter request type-length-value (TLV) that specifies the requested change to the at least one paging parameter;
   receiving directions from the base station to change at least one paging parameter at the subscriber station after the subscriber station has entered the idle mode; and
   changing the at least one paging parameter at the subscriber station after the subscriber station has entered the idle mode.

7. A method for changing paging parameters in idle mode, the method being implemented by a subscriber station, the method comprising:
  negotiating the paging parameters with a base station so that the subscriber station can enter idle mode;
  after the subscriber station has entered the idle mode, receiving directions from the base station to change at least one paging parameter at the subscriber station; and
  changing the at least one paging parameter at the subscriber station after the subscriber station has entered the idle mode, wherein receiving the directions to change the at least one paging parameter comprises receiving a ranging response (RNG-RSP) message from the base station, wherein the RNG-RSP message comprises a paging information TLV that specifies at least one change to be made to the at least one paging parameter.

8. The method of claim 6, wherein:
  the at least one paging parameter comprises a paging listening interval length;
  receiving the directions to change the paging listening interval length comprises receiving a paging message from the base station; and
  the paging message comprises a new value for the paging listening interval length.

9. A method for changing paging parameters in idle mode, the method being implemented by a subscriber station, the method comprising:
  negotiating the paging parameters with a base station so that the subscriber station can enter idle mode;
  receiving directions from the base station to change at least one paging parameter at the subscriber station, wherein the at least one paging parameter comprises a paging cycle; and
  changing the at least one paging parameter at the subscriber station after the subscriber station has entered the idle mode, wherein changing the paging cycle comprises dynamically increasing the paging cycle,
  wherein receiving the directions from the base station to dynamically increase the paging cycle comprises exchanging deregistration request (DREG-REQ) and deregistration command (DREG-CMD) messages with the base station, wherein the DREG-REQ and DREG-CMD messages comprise a starting frame number, an initial paging cycle length, and a final paging cycle length.

10. A method for changing paging parameters in idle mode, the method being implemented by a subscriber station, the method comprising:
  negotiating the paging parameters with a base station so that the subscriber station can enter idle mode;
  receiving directions from the base station to change at least one paging parameter at the subscriber station, wherein the at least one paging parameter comprises a paging cycle; and
  changing the at least one paging parameter at the subscriber station after the subscriber station has entered the idle mode, wherein changing the paging cycle comprises dynamically increasing the paging cycle, wherein dynamically increasing the paging cycle comprises starting a next paging listening interval min{previous paging cycle length×2, final paging cycle length} frames after a start of a previous paging listening interval.

11. A method for selecting a paging offset, the method being implemented by a base station, the method comprising:
  receiving a requested paging cycle from a subscriber station;
  selecting the paging offset so that the paging offset is randomly distributed within a range of the requested paging cycle; and
  notifying the subscriber station about the selected paging offset.

12. A method for selecting a paging offset, the method being implemented by an Access Service Network-Gateway (ASN-GW), the method comprising:
  maintaining paging offset utilization status for a paging group;
  calculating loading of individual paging offset values for the paging group based on the paging offset utilization status and a paging cycle that is requested by a subscriber station; and
  selecting a least loaded paging offset value for the subscriber station.

13. A base station configured for changing paging parameters in idle mode, comprising:
  a processor;
  memory in electronic communication with the processor;
  instructions stored in the memory, the instructions being executable by the processor to:
    negotiate the paging parameters with a subscriber station so that the subscriber station can enter the idle mode;
    change at least one paging parameter at the base station after the subscriber station has entered the idle mode; and
    direct the subscriber station to change the at least one paging parameter at the subscriber station after the subscriber station has entered the idle mode, the directing comprising requesting a location update from the subscriber station, receiving a ranging request (RNG-REQ) message from the subscriber station, and sending a ranging response (RNG-RSP) message to the subscriber station, wherein the RNG-RSP message comprises a paging information type-length-value that specifies the change to the at least one paging parameter.

14. The base station of claim 13, further comprising instructions stored in the memory that are executable to receive a request from the subscriber station to change the at least one paging parameter.

15. The base station of claim 13, wherein the RNG-REQ message comprises a paging parameter request type-length-value (TLV) that specifies a requested change to the at least one paging parameter.

16. The base station of claim 13, wherein the at least one paging parameter comprises a paging listening interval length, wherein the instructions executable to direct the subscriber station to change the paging listening interval length comprise instructions executable to send a paging message to the subscriber station, and wherein the paging message comprises a new value for the paging listening interval length.

17. A base station configured for changing paging parameters in idle mode, comprising:
  a processor;
  memory in electronic communication with the processor;
  instructions stored in the memory, the instructions being executable by the processor to:
    negotiate the paging parameters with a subscriber station so that the subscriber station can enter the idle mode;
    change at least one paging parameter at the base station after the subscriber station has entered the idle mode, wherein the at least one paging parameter comprises a paging cycle, and wherein changing the paging cycle comprises dynamically increasing the paging cycle; and direct the subscriber station to change the at least one paging parameter at the subscriber station after the subscriber station has entered the idle mode, wherein:
the at least one paging parameter comprises a paging cycle;
the instructions executable to change the paging cycle comprise instructions executable to dynamically increase the paging cycle;
the instructions executable to direct the subscriber station to dynamically increase the paging cycle comprise instructions executable to exchange deregistration request (DREG-REQ) and deregistration command (DREG-CMD) messages with the subscriber station; and
the DREG-REQ and DREG-CMD messages comprise a starting frame number, an initial paging cycle length, and a final paging cycle length.

18. A subscriber station that is configured for changing paging parameters in idle mode, comprising:
a processor;
memory in electronic communication with the processor;
instructions stored in the memory, the instructions being executable by the processor to:
negotiate the paging parameters with a base station so that the subscriber station can enter idle mode;
request that the base station change the at least one paging parameter, wherein requesting comprises sending a ranging request (RNG-REQ) message to the base station, wherein the RNG-REQ message comprises a paging parameter request type-length-value (TLV) that specifies the requested change to the at least one paging parameter;
receive directions from the base station to change at least one paging parameter at the subscriber station after the subscriber station has entered the idle mode; and
change the at least one paging parameter at the subscriber station after the subscriber station has entered the idle mode.

19. A subscriber station that is configured for changing paging parameters in idle mode, comprising:
a processor;
memory in electronic communication with the processor;
instructions stored in the memory, the instructions being executable by the processor to:
negotiate the paging parameters with a base station so that the subscriber station can enter idle mode;
receive directions from the base station to change at least one paging parameter at the subscriber station after the subscriber station has entered the idle mode; and
change the at least one paging parameter at the subscriber station after the subscriber station has entered the idle mode, wherein the instructions executable to receive the directions to change the at least one paging parameter comprise instructions executable to receive a ranging response (RNG-RSP) message from the base station, wherein the RNG-RSP message comprises a paging information TLV that specifies at least one change to be made to the at least one paging parameter.

20. The subscriber station of claim 18, wherein the at least one paging parameter comprises a paging listening interval length, wherein the instructions executable to receive the directions to change the paging listening interval length comprise instructions executable to receive a paging message from the base station, and wherein the paging message comprises a new value for the paging listening interval length.

21. A subscriber station that is configured for changing paging parameters in idle mode, comprising:
a processor;
memory in electronic communication with the processor;
instructions stored in the memory, the instructions being executable by the processor to:
negotiate the paging parameters with a base station so that the subscriber station can enter idle mode;
receive directions from the base station to change at least one paging parameter at the subscriber station after the subscriber station has entered the idle mode, wherein the at least one paging parameter comprises a paging cycle; and
change the at least one paging parameter at the subscriber station after the subscriber station has entered the idle mode, wherein the instructions executable to change the paging cycle comprise instructions executable to dynamically increase the paging cycle,
wherein the instructions executable to receive the directions from the base station to dynamically increase the paging cycle comprise instructions executable to exchange deregistration request (DREG-REQ) and deregistration command (DREG-CMD) messages with the base station, wherein the DREG-REQ and DREG-CMD messages comprise a starting frame number, an initial paging cycle length, and a final paging cycle length.

22. A subscriber station that is configured for changing paging parameters in idle mode, comprising:
a processor;
memory in electronic communication with the processor;
instructions stored in the memory, the instructions being executable by the processor to:
negotiate the paging parameters with a base station so that the subscriber station can enter idle mode;
receive directions from the base station to change at least one paging parameter at the subscriber station after the subscriber station has entered the idle mode, wherein the at least one paging parameter comprises a paging cycle; and
change the at least one paging parameter at the subscriber station after the subscriber station has entered the idle mode, wherein the instructions executable to change the paging cycle comprise instructions executable to dynamically increase the paging cycle, and wherein the instructions executable to dynamically increase the paging cycle comprise instructions executable to start a next paging listening interval min{previous paging cycle length×2, final paging cycle length} frames after a start of a previous paging listening interval.

23. A base station that is configured for selecting a paging offset, comprising:
a processor;
memory in electronic communication with the processor;
instructions stored in the memory, the instructions being executable by the processor to:
receive a requested paging cycle from a subscriber station;
select the paging offset so that the paging offset is randomly distributed within a range of the requested paging cycle; and
notify the subscriber station about the selected paging offset.

24. An Access Service Network-Gateway (ASN-GW) that is configured for selecting a paging offset, comprising:
a processor;
memory in electronic communication with the processor;
instructions stored in the memory, the instructions being executable by the processor to:
maintain paging offset utilization status for a paging group;
calculate loading of individual paging offset values for the paging group based on the paging offset utilization status and a paging cycle that is requested by a subscriber station; and
select a least loaded paging offset value for the subscriber station.

25. A base station configured for changing paging parameters in idle mode, comprising:
means for negotiating the paging parameters with a subscriber station so that the subscriber station can enter the idle mode;
means for changing at least one paging parameter at the base station after the subscriber station has entered the idle mode; and
means for directing the subscriber station to change the at least one paging parameter at the subscriber station after the subscriber station has entered the idle mode,
wherein the means for directing the subscriber station to change the at least one paging parameter comprises:
means for requesting a location update from the subscriber station;
means for receiving a ranging request (RNG-REQ) message from the subscriber station; and
means for sending a ranging response (RNG-RSP) message to the subscriber station, wherein the RNG-RSP message comprises a paging information type-length-value that specifies the change to the at least one paging parameter.

26. The base station of claim 25, further comprising means for receiving a request from the subscriber station to change the at least one paging parameter.

27. The base station of claim 25, wherein the RNG-REQ message comprises a paging parameter request type-length-value (TLV) that specifies a requested change to the at least one paging parameter.

28. The base station of claim 25, wherein the at least one paging parameter comprises a paging listening interval length, wherein the means for directing the subscriber station to change the paging listening interval length comprises means for sending a paging message to the subscriber station, and wherein the paging message comprises a new value for the paging listening interval length.

29. A base station configured for changing paging parameters in idle mode, comprising:
means for negotiating the paging parameters with a subscriber station so that the subscriber station can enter the idle mode;
means for changing at least one paging parameter at the base station after the subscriber station has entered the idle mode; and
means for directing the subscriber station to change the at least one paging parameter at the subscriber station after the subscriber station has entered the idle mode, wherein the at least one paging parameter comprises a paging cycle, and wherein the means for changing the paging cycle comprises means for dynamically increasing the paging cycle, wherein the means for directing the subscriber station to dynamically increase the paging cycle comprises means for exchanging deregistration request (DREG-REQ) and deregistration command (DREG-CMD) messages with the subscriber station, wherein the DREG-REQ and DREG-CMD messages comprise a starting frame number, an initial paging cycle length, and a final paging cycle length.

30. A subscriber station that is configured for changing paging parameters in idle mode, comprising:
means for negotiating the paging parameters with a base station so that the subscriber station can enter idle mode;
means for requesting that the base station change the at least one paging parameter, wherein the means for requesting that the base station change the at least one paging parameter comprises means for sending a ranging request (RNG-REQ) message to the base station, wherein the RNG-REQ message comprises a paging parameter request type-length-value (TLV) that specifies the requested change to the at least one paging parameter;
means for receiving directions from the base station to change at least one paging parameter at the subscriber station after the subscriber station has entered the idle mode; and
means for changing the at least one paging parameter at the subscriber station after the subscriber station has entered the idle mode.

31. A subscriber station that is configured for changing paging parameters in idle mode, comprising:
means for negotiating the paging parameters with a base station so that the subscriber station can enter idle mode;
means for receiving directions from the base station to change at least one paging parameter at the subscriber station after the subscriber station has entered the idle mode; and
means for changing the at least one paging parameter at the subscriber station after the subscriber station has entered the idle mode,
wherein the means for receiving the directions to change the at least one paging parameter comprises means for receiving a ranging response (RNG-RSP) message from the base station, wherein the RNG-RSP message comprises a paging information TLV that specifies at least one change to be made to the at least one paging parameter.

32. The subscriber station of claim 30, wherein the at least one paging parameter comprises a paging listening interval length, wherein the means for receiving the directions to change the paging listening interval length comprises means for receiving a paging message from the base station, and wherein the paging message comprises a new value for the paging listening interval length.

33. A subscriber station that is configured for changing paging parameters in idle mode, comprising:
means for negotiating the paging parameters with a base station so that the subscriber station can enter idle mode;
means for receiving directions from the base station to change at least one paging parameter at the subscriber station after the subscriber station has entered the idle mode wherein the at least one paging parameter comprises a paging cycle, the means for receiving the directions from the base station to dynamically increase the paging cycle comprises means for exchanging deregistration request (DREG-REQ) and deregistration command (DREG-CMD) messages with the base station, and the DREG-REQ and DREG-CMD messages comprise a starting frame number, an initial paging cycle length, and a final paging cycle length; and means for changing the at least one paging parameter at the subscriber station after the subscriber station has entered the idle mode, wherein the means for changing the paging cycle comprises means for dynamically increasing the paging cycle.

34. A subscriber station that is configured for changing paging parameters in idle mode, comprising:

means for negotiating the paging parameters with a base station so that the subscriber station can enter idle mode;

means for receiving directions from the base station to change at least one paging parameter at the subscriber station after the subscriber station has entered the idle mode; and means for changing the at least one paging parameter at the subscriber station after the subscriber station has entered the idle mode, wherein the at least one paging parameter comprises a paging cycle, and wherein the means for changing the paging cycle comprises means for dynamically increasing the paging cycle, wherein the means for dynamically increasing the paging cycle comprises means for starting a next paging listening interval min{previous paging cycle length×2, final paging cycle length} frames after a start of a previous paging listening interval.

35. A base station that is configured for selecting a paging offset, comprising:

means for receiving a requested paging cycle from a subscriber station;

means for selecting the paging offset so that the paging offset is randomly distributed within a range of the requested paging cycle; and means for notifying the subscriber station about the selected paging offset.

36. An Access Service Network-Gateway (ASN-GW) that is configured for selecting a paging offset, comprising:

means for maintaining paging offset utilization status for a paging group;

means for calculating loading of individual paging offset values for the paging group based on the paging offset utilization status and a paging cycle that is requested by a subscriber station; and means for selecting a least loaded paging offset value for the subscriber station.

37. A computer-program product for a base station to change paging parameters in idle mode, the computer-program product comprising a computer-readable medium having instructions thereon, the instructions comprising:

code for negotiating the paging parameters with a subscriber station so that the subscriber station can enter the idle mode;

code for changing at least one paging parameter at the base station after the subscriber station has entered the idle mode; and code for directing the subscriber station to change the at least one paging parameter at the subscriber station after the subscriber station has entered the idle mode, wherein the code for directing the subscriber station to change the at least one paging parameter comprises:

code for requesting a location update from the subscriber station;

code for receiving a ranging request (RNG-REQ) message from the subscriber station; and code for sending a ranging response (RNG-RSP) message to the subscriber station, wherein the RNG-RSP message comprises a paging information type-length-value that specifies the change to the at least one paging parameter.

38. A computer-program product for a subscriber station to change paging parameters in idle mode, the computer-program product comprising a computer-readable medium having instructions thereon, the instructions comprising:

code for negotiating the paging parameters with a base station so that the subscriber station can enter idle mode;

code for requesting directions from the base station to change at least one paging parameter at the subscriber station, the requesting directions comprising sending a ranging request (RNG-REQ) message to the base station, wherein the RNG-REQ message comprises a paging parameter request type-length-value (TLV) that specifies the requested change to the at least one paging parameter;

code for receiving directions from the base station to change at least one paging parameter at the subscriber station after the subscriber station has entered the idle mode; and code for changing the at least one paging parameter at the subscriber station after the subscriber station has entered the idle mode.

39. A computer-program product for a base station to select a paging offset, the computer-program product comprising a computer-readable medium having instructions thereon, the instructions comprising:

code for receiving a requested paging cycle from a subscriber station;

code for selecting the paging offset so that the paging offset is randomly distributed within a range of the requested paging cycle; and code for notifying the subscriber station about the selected paging offset.

40. A computer-program product for an Access Service Network-Gateway (ASN-GW) to select a paging offset, the computer-program product comprising a computer-readable medium having instructions thereon, the instructions comprising:

code for maintaining paging offset utilization status for a paging group;

code for calculating loading of individual paging offset values for the paging group based on the paging offset utilization status and a paging cycle that is requested by a subscriber station; and code for selecting a least loaded paging offset value for the subscriber station.

* * * * *